US007046992B2

(12) United States Patent
Wallentin et al.

(10) Patent No.: US 7,046,992 B2
(45) Date of Patent: May 16, 2006

(54) AUTHENTICATION OF TERMINATION MESSAGES IN TELECOMMUNICATIONS SYSTEM

(75) Inventors: Pontus Wallentin, Linköping (SE); Per Elmdahl, Linköping (SE); Ingrid Norstrand, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 575 days.

(21) Appl. No.: 10/113,944

(22) Filed: Apr. 2, 2002

(65) Prior Publication Data

US 2003/0003895 A1    Jan. 2, 2003

Related U.S. Application Data

(63) Continuation-in-part of application No. 09/852,915, filed on May 11, 2001.

(60) Provisional application No. 60/317,970, filed on Sep. 10, 2001.

(51) Int. Cl.
*H04M 1/66*    (2006.01)

(52) U.S. Cl. .................. 455/411; 455/422.1; 455/432.1

(58) Field of Classification Search ................ 455/411, 455/422.1, 432.1, 435.1; 380/247, 248, 249, 380/270; 713/168, 169, 170, 171
See application file for complete search history.

(56) References Cited

U.S. PATENT DOCUMENTS

| 4,984,290 | A |   | 1/1991 | Levine et al. |
| 5,537,474 | A | * | 7/1996 | Brown et al. ................ 380/248 |
| 5,596,641 | A | * | 1/1997 | Ohashi et al. ............... 380/248 |
| 5,642,401 | A | * | 6/1997 | Yahagi ........................ 455/411 |

(Continued)

FOREIGN PATENT DOCUMENTS

EP    0 708 571 A2    4/1996

(Continued)

OTHER PUBLICATIONS

U.S. Appl. No. 09/852,915, filed May 11, 2001, and entitled "Releasing Plural Radio Connections With Omnibus Release Message".

*Primary Examiner*—Temica Beamer
(74) *Attorney, Agent, or Firm*—Nixon & Vanderhye, P.C.

(57) ABSTRACT

An authentication mechanism renders a communications network impervious to unauthorized requests for interaction termination or cessation. In a release authentication mode of operation, the authentication mechanism protects against an unauthorized connection release message directed to a mobile node (30) of the network, e.g., a mobile station such as a user equipment unit, thereby thwarting an attempt to request an unauthorized connection release procedure concerning a connection involving the mobile node. In a detach authentication mode of operation, the authentication mechanism protects against an unauthorized detach message deceptively transmitted on behalf of a mobile node, thereby thwarting an attempt to request an unauthorized detach procedure for the mobile node. In its modes of operation, the authentication mechanism involves a first node ($N_t$) of the communications network at which authentication key is provided. The first node of the network uses the authentication key to derive an authentication indicia related to the authentication key. The first node ($N_t$) provides the authentication indicia to a second node ($N_r$) of the network. Subsequently, when an interaction termination operation is to occur (e.g., connection release or detach), the first node includes the authentication key in an interaction termination message transmitted over an air interface between the first node and the second node. As a condition for performing an interaction termination operation, the second node ($N_r$) confirms that the authentication key (which was included in the interaction termination message) is, in fact, related to the authentication indicia.

100 Claims, 17 Drawing Sheets

U.S. PATENT DOCUMENTS

| | | | |
|---|---|---|---|
| 5,794,139 A * | 8/1998 | Mizikovsky et al. | 455/403 |
| 6,173,173 B1 | 1/2001 | Dean et al. | |
| 6,208,869 B1 * | 3/2001 | Roberts et al. | 455/465 |
| 6,526,509 B1 * | 2/2003 | Horn et al. | 713/171 |
| 2002/0178358 A1 * | 11/2002 | Perkins et al. | 713/169 |

FOREIGN PATENT DOCUMENTS

| | | |
|---|---|---|
| WO | 95/15665 | 6/1995 |
| WO | 00/76243 A1 | 12/2000 |
| WO | 01/80591 A2 | 10/2001 |

\* cited by examiner

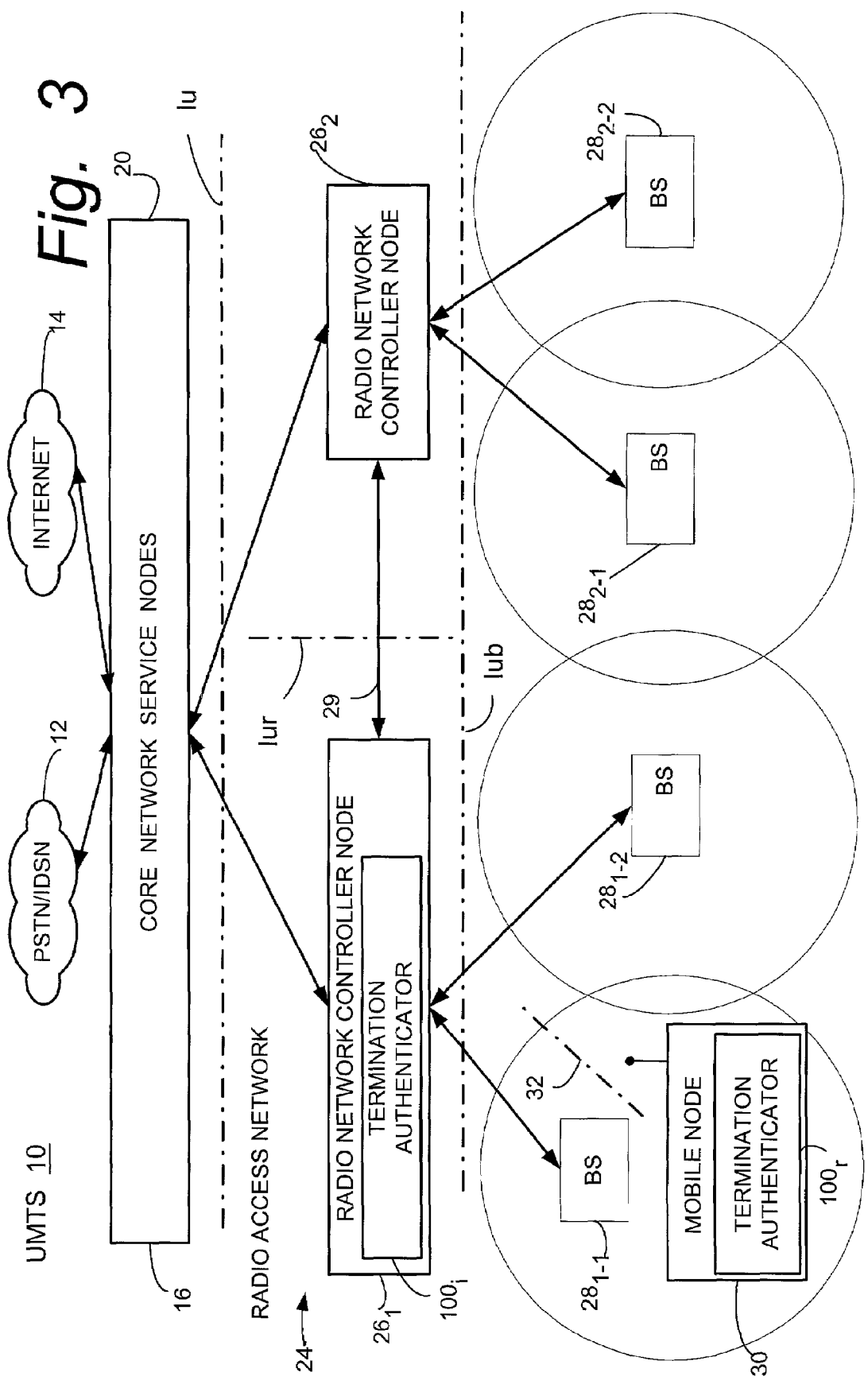

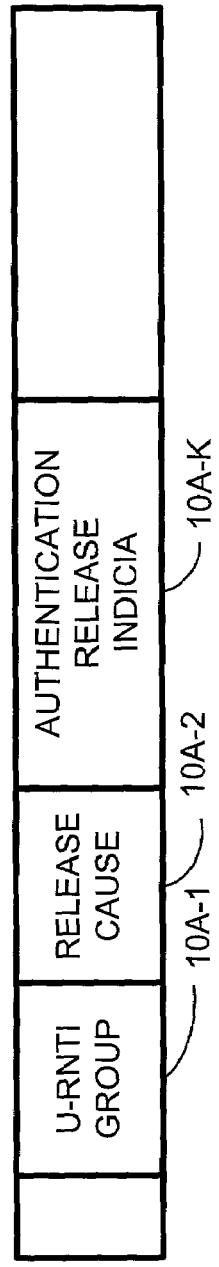

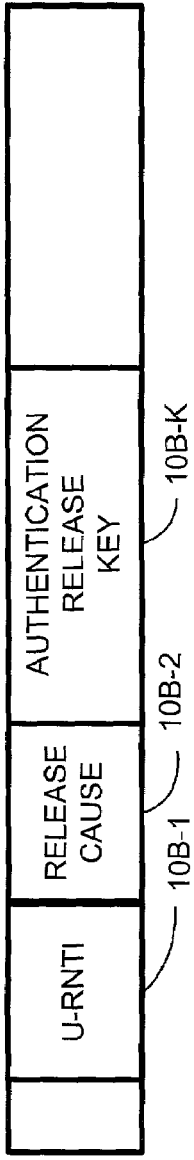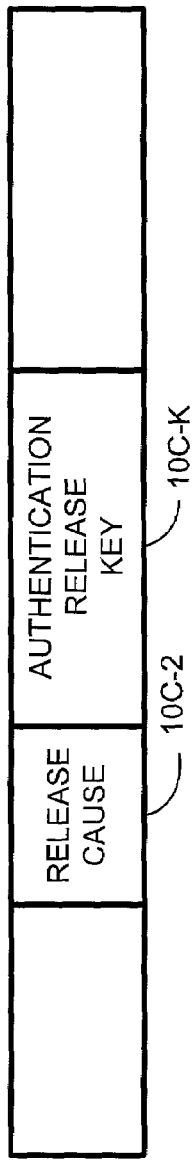

AUTHENTICATION OF TERMINATION MESSAGES IN TELECOMMUNICATIONS SYSTEM

This application is a continuation-in-part of United States Patent Application: U.S. patent application Ser. No. 09/852,915, filed May 11, 2001, and entitled "RELEASING PLURAL RADIO CONNECTIONS WITH OMNIBUS RELEASE MESSAGE," and is related to U.S. Provisional Patent Application Ser. No. 60/317,970, filed Sep. 10, 2001, entitled RECOVERY OF MOBILE STATION(S) IN CONNECTED MODE UPON RNC FAILURE, all of which are incorporated herein by reference in their entirety.

BACKGROUND

1. Field of the Invention

The invention pertains to the protection and safety of telecommunication systems, and particularly to authentication of certain messages which are utilized to terminate an aspect of communications over an air interface involving a mobile station.

2. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

Other types of telecommunications systems which encompass radio access networks include the following: Advance Mobile Phone Service (AMPS) system; the Narrowband AMPS system (NAMPS); the Total Access Communications System (TACS); the Personal Digital Cellular (PDS) system; the United States Digital Cellular (USDC) system; and the code division multiple access (CDMA) system described in EIA/TIA IS-95.

There are certain procedures in telecommunications systems which essentially involve termination or cessation of some type of interaction with a mobile station such as a user equipment unit. The interaction may be, for example, a radio connection between the user equipment unit and the radio access network (e.g., a RRC connection), or tracking of the user equipment unit by the core network. In the situation of termination of the radio connection with the radio access network, a message such as a release message may initiate the connection release. In the case where it is no longer necessary for the core network to track the user equipment unit, a detach message may be employed to initiate a detach operation. Thus, both the connection release message and the detach message are examples of termination or cessation messages.

As explained below, security issues can arise if an unauthorized party is able to initiate otherwise unrequested and undesired instances of a termination or cessation message. As a precursor for an understanding of the circumstances in which such security issues can arise, brief and generalized comments regarding various topics are below provided. These topics include routing areas; location areas; signalling protocols employed between the radio access network and the user equipment unit (including modes and states of modes of models of such protocols); and, failure of a radio access network control node. These topics culminate with further information regarding the connection release and detach procedures.

The topology of a radio access network can be conceptualized in areas or units larger than cells. Taking the UTRAN as an example radio access network, a UTRAN Routing Area (URA) is a geographical area comprising one or more cells. Each URA is identified by a unique identity which is broadcast in all cells belonging to the URA. A URA can comprise cells controlled by more than one RNC. A URA with more cells in more than one RNC is overlapping between the RNCs, i.e. an overlapping URA.

As another example from UTRAN, a Location Area (LA) is a geographical area comprising one or more cells. Each LA is identified by a unique identity sent on the broadcast channel, in the same way as the URA. However, a location area is used by the core network to track the location of the UE (in idle mode and in connected mode), while the URA is used by the radio access network to track the location of the UE in connected mode. Typically, a location area is geographically larger than a URA. To each location area there is one of several RNCs having cells in that particular location area. A relationship between location area and RNC is stored in the core network.

Radio access networks typically have a particular signalling protocol employed between the radio access network and the user equipment unit to support the management of radio resources. For example, UTRAN has its Radio Resource Control (RRC) layer 3 signalling protocol. A user equipment unit in the RRC protocol operates in a state model conceptualized as having two modes: an Idle Mode and a Connected Mode. The Idle Mode is entered after power on. In Idle Mode there is no connection between the user equipment unit (UE) and the UTRAN. When an RRC connection is established, the user equipment unit (UE) is assigned a U-RNTI and the user equipment unit (UE) enters Connected Mode. The U-RNTI (UTRAN Radio Network Temporary Identity) is a global identity, which can be used in any cell in the UTRAN. In Connected Mode, the RNC in charge of the RRC connection for this UE is denoted as the Serving RNC (SRNC). The U-RNTI consists of two parts: the SRNC-identity (which within UTRAN identifies the SRNC for this UE) and the Serving RNTI (S-RNTI) which identifies the RRC connection within the particular SRNC.

As illustrated by FIG. 11, within Connected Mode there are four different states: CELL_DCH state; CELL_FACH state; CELL_PCH state; and URA_PCH. As summarized briefly below, each state reflects a different level of activity.

The CELL_DCH state is characterized, e.g., by having a dedicated channel (DCH) assigned to the user equipment unit (UE). Macro-diversity may be used between DCHs of several cells. In the CELL_DCH state, there is a dedicated control channel (DCCH) used for transmission of signalling messages between the user equipment unit (UE) and the UTRAN.

In the CELL_FACH state, no dedicated physical channel is assigned, but the user equipment unit (UE) listens continuously to a common channel (the FACH) in the downlink belonging to the selected cell. In the uplink, the user equipment unit (UE) typically uses a random access channel (RACH). At each cell reselection, the user equipment unit (UE) updates the network with its current cell location. In this state, there is a dedicated control channel (DCCH) used for transmission of signalling messages between the user equipment unit (UE) and the UTRAN. The DCCH is implemented by appending the Radio Network Temporary Identity (U-RNTI or C-RNTI) to all signalling messages, and thus addressing an individual UE. As mentioned previously, the U-RNTI (UTRAN RNTI) is a global identity, which can be used in any cell in the UTRAN. The C-RNTI (Cell RNTI) is only significant in a single cell, and has to be reallocated in every cell. On the other hand, C-RNTI is much shorter than the U-RNTI which saves space over the radio interface when it is used. There is also a CCCH (Common control channel) in this state, which is used when the connection to the SRNC is not available, such at after cell reselection over RNC borders, when the CELL UPDATE or URA UPDATE message is sent to the DRNC.

In the CELL_PCH state, the user equipment unit (UE) monitors a paging channel (PCH) of a selected cell. On the PCH, the user equipment unit (UE) uses discontinuous reception (DRX) to save power, and the scheme for when to listen is agreed between the network and the user equipment unit (UE) on a per user equipment unit (UE) basis. Also in the CELL_PCH state the user equipment unit (UE) updates the network with its current cell location at cell reselection. No DCCH is available in the CELL_PCH state. On the PCH, means for addressing individual user equipment units (UEs) exist (using the U-RNTI), but the user equipment unit (UE) can not transport any signalling messages to the network.

The URA_PCH state is almost identical to the CELL_PCH state. The difference is that the user equipment unit (UE) does only update the network of its location after crossing URA borders. As mentioned before, the URA (UTRAN Registration Area) is a group of cells. This means that in this state the position of the user equipment unit (UE) is in general known only on URA level.

Unfortunately, a control node of a radio access network, such as an radio network controller (RNC) of the UTRAN, may experience a failure which seriously affects the control node, either in whole or in part. When such a failure occurs, certain information about the context of the user equipment unit, known as the "UE context" in the UTRAN, may be lost, particularly upon reset of the control node.

The information included in UE context comprises, among others, the following parameters: IMSI (the international mobile subscriber identity); C-ID; D-RNTI; and RNC Identity of the DRNC where the user equipment unit (UE) is currently located. The international mobile subscriber identity (IMSI) [which comprises not more than fifteen digits] comprises three components: a mobile country code (MCC)[three digits]; a mobile network code (MNC)[two or three digits]; and a mobile subscriber identification number (MSIN). The D-RNTI parameter is similar to S-RNTI parameter, but identifies the UE context information in the DRNC. The C-ID parameter is the Cell Identity of where the UE is currently located. The C-ID parameter is not applicable to the UEs in the URA_PCH state, since the location of a user equipment unit (UE) in the URA_PCH state is not known to the cell level, but rather is known on URA level (a group of cells defined as one URA). With regard to the RNC Identity parameter, it is noted that in the Cell_DCH state there could be many simultaneous radio links (RLs), so there could conceivably be as many RNCs (at least theoretically) handling legs of connections to the UE.

In a failure case, when the radio connection is lost, the user equipment unit (UE) and UTRAN enter Idle Mode when a failure is detected. Failure detection is quickest in the CELL_DCH state, as the physical channel is lost in that case. The user equipment units in the CELL_DCH state may expect a loss of synchronization and, at the recovery, go to CELL_FACH state after having selected a suitable cell. During the recovery, they attempt to reach UTRAN on a random access channel (such as the RACH). If that fails, they enter Idle Mode. When there is a loss of a radio connection with the radio access network (for example, a loss of the RRC connection), the user equipment units in states comparable to the CELL_FACH, CELL_PCH and URA_PCH states will not necessarily notice the loss. Moreover, in the CELL_FACH, CELL_PCH and URA_PCH states, in the circumstances in which failure can be detected, such failure detection is much slower since it relies on a periodic supervision unit every set number of minutes, where the user equipment unit (UE) makes periodic CELL UPDATE or URA UPDATE depending on the state.

If an RNC which loses the UE context (for a UE for which it was the SRNC) receives a paging request originated at the core network, the RNC assumes the user equipment unit is in idle mode. Therefore, the RNC will page the user equipment unit with the core network UE identity. However, if the user equipment unit is still in the connected mode, the user equipment unit will only detect paging using the identity in connected mode, that is the U-RNTI.

As now briefly and generally explained, the core network UE identity (such as TMSI) cannot be used for paging the UE in the connected mode. In the idle mode the user equipment unit reads the location area identity on the broadcast channel and makes a registration towards the core network when it changes location area. Upon registration, the user equipment unit receives a new core network UE identity (TMSI), since the TMSI is only valid within a location area. In the connected mode the serving RNC controls the location area the user equipment unit is registered in towards the core network. The core network knows in which location area the user equipment unit is registered, and will upon paging send the paging request to each RNC having cells in that location area. The location area identity is in connected mode always sent directly to each user equipment unit from the SRNC on a dedicated control channel. The connected mode user equipment unit ignores the location area identity on the broadcast channel. Thus, the connected mode user equipment unit may camp in a cell, on which broadcast channel a different location area identity is sent than the location in which the TMSI is valid.

To ensure that the user equipment units (for which contexts are lost in the RNC) are reachable by core network-originated paging after the RNC reset, it is important to bring such user equipment units to idle mode. Since there may be a lot of UE contexts lost in a worst scenario, a "mass release" of user equipment units may be needed. To "release" a radio connection such as an RRC connection between the radio access network (like UTRAN) and the mobile terminal (like the user equipment unit), the mobile terminal must leave the connected mode and enter idle mode. There are several known methods for releasing such a radio connection.

In a normal case of releasing a radio connection, illustrated in the context of the RRC connection of UTRAN, the network sends a RRC CONNECTION RELEASE message to the user equipment unit on the dedicated control channel (DCCH). The user equipment unit acknowledges receipt of the release message by transmitting a RRC CONNECTION RELEASE COMPLETE, and then entering idle mode so that the initiating party can enter idle mode as well. After the release, the U-RNTI that was allocated by the connection can be reused by another connection.

A possibility has been introduced in WCDMA to transmit the RRC CONNECTION RELEASE message on a common control channel (CCCH). The purpose of this solution is to enable the DRNC to release the connection to a given user equipment unit (UE), if the SRNC can not transmit the message (the DCCH originates in the SRNC).

In the conventional practice, only one user equipment unit (UE) at a time can be released using the RRC CONNECTION RELEASE message sent from UTRAN to the user equipment unit (UE). Radio connection release on a user equipment unit by user equipment unit basis is generally satisfactory in most situations. However, in a failure situation when all connections belonging to an RNC (SRNC or DRNC) have to be released (like restart of RNC or a reset is received from the core network), this conventional practice entails an enormous amount of signaling messages. Such massive signaling causes significant load in the radio network control (RNC) node(s) as well over the radio interface. Since the resources are limited, the RRC CONNECTION RELEASE messages can not be sent instantaneously to all UEs and thus they will take some time to transmit. This delay will typically cause inconvenience for the user. Moreover, this delay increases a risk that a U-RNTI, already in use by a first user equipment unit (UE), will be prematurely allocated to a new connection. Furthermore, in case of restart of an radio network control (RNC) node, the RNC may forget which U-RNTIs were allocated to user equipment units (UEs) before the restart.

In view of the foregoing, the release of plural radio connections using a single release message (known as the "omnibus release message") has been proposed in U.S. patent application Ser. No. 09/852,915, filed May 11, 2001, and entitled "RELEASING PLURAL RADIO CONNECTIONS WITH OMNIBUS RELEASE MESSAGE," which is incorporated herein by reference in its entirety. The omnibus release message makes it possible to save signalling and reduce the delay be addressing multiple UEs in the same release message on the CCCH or the PCCH.

Typically there is some type of protocol employed between the UE and the core network domain to support the mobility, identification and security of the UEs, e.g., a Mobility Management (MM) protocol is used between the UE and the core network domain to support the mobility, identification and security of the UEs. A MM protocol UE state model is illustrated in FIG. 12 as having three states: a MM-connected state; a MM-idle state; and, a MM-detached state.

In the MM-connected state, the mobile communicates with the core network domain over a signalling connection. The signalling connection requires that a radio connection (e.g., an RRC connection) between the UE and the radio access network be established (that is, the RRC protocol is in one of the states in connected mode). The location of the mobile is in this state tracked by radio resource control functions, using e.g. handover, normally on cell level using the RRC protocol.

In the MM-idle state, there is no ongoing communication between the core network domain and the specific mobile. Since there may be two parallel MM protocols (one for each core network domain), the RRC layer may either be in idle mode or in connected mode. The location of the mobile is tracked on registration area level and stored in the core network domain. The mobile listens to paging. From the core network domain, the UE is reachable by paging in the registration area.

In the MM-detached state, the location of the mobile is not known by the core network domain. The mobile is "switched off".

The release operation is just one type of operation in which some type of interaction involving a mobile station (user equipment unit) is terminated or ceased. In the release operation a signaling protocol connection is the type of interaction which is terminated or ceased. Another type of cessation or termination of interaction is a detach operation, which can occur (for example) upon powering down of the mobile station.

In the above regard, a detach procedure is used to bring the user equipment unit to the MM-detached state (see FIG. 12). The detach procedure is typically run when the user presses the "off" button on the user equipment unit in order to power down. In this situation, the detach message is sent from the user equipment unit to the core network domain at power off the user equipment unit. The core network domain may then mark this user equipment unit as detached. This makes it possible to avoid unnecessary paging towards powered off user equipment units at mobile terminating call request.

To run the detach procedure, a signalling connection needs to be established. If there is no signalling connection (e.g., if the user equipment unit is in MM-idle state) when the user press the "off" button, the signalling connection needs to be established first. And if there is no signalling connection for any other core network domains presently involved, the radio connection will also need to be established.

Basic aspects of a conventional detach procedure are illustrated in FIG. 13, wherein it is assumed that the signalling connection is already established (the MM layer for this core network domain is in MM-connected state). As step 13-1, the user equipment unit (UE) sends an IMSI DETACH INDICATION message on the signalling connection to the core network. The IMSI DETACH INDICATION message goes transparently through the radio access network to the core network node (e.g., to a MSC node in this example). The IMSI DETACH INDICATION message includes an identity of the user equipment unit (such as the TMSI or possibly the IMSI). When the core network node receives the IMSI DETACH INDICATION message, the core network initiates a release of the signalling connection, by sending (as step 13-2) an IU RELEASE message to the RNC. The radio access network (the RNC node) responds to the core network (advising that the release of the signalling connection will undertaken) by sending (as step 13-3) an IU RELEASE COMPLETE message back to the core network node. The core network can now mark the user equipment unit as in MM-detached state. If any terminating calls are received at this point, the core network does not need to page the user equipment unit since the core network will assume that the user equipment unit is not reachable, and it will simply reply with a signal or voice message alerting the calling party that the called party is not reachable for the moment.

If the parallel MM layer for any other core network domain does not have a signalling connection, as step 13-4 the radio access network will initiate the RRC connection release procedure to the user equipment unit. The RRC connection release procedure will in this case release both the signalling connection and the radio connection (e.g., RRC connection). If there is another signalling connection established for the other CN domain, the radio access network will keep the RRC connection, and just release the signalling connection by sending a SIGNALLING CONNECTION RELEASE message.

After transmitting the IMSI DETACH INDICATION message, the user equipment unit starts a timer to supervise the release of the signalling connection. If the signalling connection is not released by the network before the expiry of this timer, e.g. if some of the messages do not get through (e.g. IMSI DETACH INDICATION or the RRC CONNECTION RELEASE message), the UE will release the signalling connection locally and enter MM-detached state.

On the network side, the release of the signalling connection is supervised as well. If the user equipment unit does not respond (in the case above with the last signalling connection), the radio access network will delete all information about the user equipment unit and assume the radio channel was lost.

Since the user equipment unit is about to power off when the detach procedure is run, the detach procedure has to be fast. To speed up the detach procedure, it is not required to start security functions like encryption for these messages. If the encryption was to be started, several messages were needed including a possible authentication procedure between the UE and the core network.

A shortcoming of the omnibus release message alluded to previously is that a non-friendly party can use this message nefariously but efficiently to release user equipment units. Since the message has to be sent unencrypted and includes publicly available information, this message can, if available to an intruder, be a serious security threat.

A similar security issue arises with respect to the detach procedure with its IMSI DETACH INDICATION message, which conventionally is not protected by any security functions, like authentication and/or ciphering and/or integrity. This means for example, that an intruder can send the IMSI DETACH INDICATION message on behalf of another user equipment unit by including this UE's identity in the IMSI DETACH INDICATION message. Since the core network, as part of the handling of the unsuccessful cases of this procedure will mark the user equipment unit as detached even if the user equipment unit did not respond to the request to release the signalling connection, will mark the UE as detached, this user equipment unit will not be able to receive any calls. This will happen even if the user equipment unit in reality did not detach. Thus, it could be possible to detach a lot of user equipment units by detaching them one by one, cycling through the whole value range of user equipment unit identities (e.g., using a fake user equipment unit).

What is needed, therefore, and described herein, is an authentication system which averts unauthorized termination of interaction with a mobile node such as a user equipment unit.

BRIEF SUMMARY

An authentication mechanism renders a communications network impervious to unauthorized requests for termination or cessation of interaction with a mobile node. In a release authentication mode of operation, the authentication mechanism protects against an unauthorized connection release message directed to a mobile node of the network, e.g., a mobile station such as a user equipment unit, thereby thwarting an attempt to request an unauthorized connection release procedure concerning a connection involving the mobile node. In a detach authentication mode of operation, the authentication mechanism protects against an unauthorized detach message deceptively transmitted on behalf of a mobile node, thereby thwarting an attempt to request an unauthorized detach procedure for the mobile node.

In its modes of operation, the authentication mechanism involves a first node of the communications network at which an authentication key is provided. The authentication key can be either generated (e.g. selected) by the first node or assigned to the first node. The first node of the network uses the authentication key to derive an authentication indicia related to the authentication key. The first node provides the authentication indicia to a second node of the network. Subsequently, when a mobile interaction termination operation is to occur (e.g., connection release or detach), the first node includes the authentication key in a termination message transmitted over an air interface between the first node and the second node. As a condition for performing an operation with terminates the interaction with the mobile node, the second node confirms that the authentication key (which was included in the interaction termination message) is, in fact, related to the authentication indicia.

In the release authentication mode of operation, in one example implementation the first node (which provides the authentication indicia to the second node of the network) is a radio access network node (e.g., a radio network controller) and the second node is a mobile node (e.g., a user equipment unit). The radio access network node provides the authentication indicia to the mobile node in a first radio resource control (RRC) message (e.g., a radio resource control (RRC) connection establish message), and the radio access network node includes the authentication key in a second radio resource control (RRC) message (e.g., a radio resource control (RRC) connection release message). The mobile node confirms that the authentication key included in the second radio resource control (RRC) message is related to the authentication indicia as a condition for performing the connection release operation.

In the detach authentication mode of operation, in one example implementation the first node (which provides the authentication indicia to the second node of the network) is a mobile node (e.g., a user equipment unit) and the second node is a core network node (e.g., a MSC). The mobile node can provide the authentication indicia to the core network upon occurrence of a predetermined event (e.g., registration of the mobile node with the core network). Thereafter, when initiating a detach operation, the mobile node includes the authentication key, e.g., in a detach message (for example, an IMSI detach indication message). As a condition for performing its part of the detach operation, the core network node first confirms that the authentication key communicated to the core network node in the detach message is related to the previously-received authentication indicia. In one implementation, the mobile node uses the IMSI or the TMSI of the mobile node to generate the authentication indicia which is provided to the core network, and likewise the core network node uses the IMSI or the TMSI of the mobile node to confirm that the authentication key is related to the authentication indicia.

As one scenario of implementing the authentication modes, the authentication indicia is related to the authentication key by being equal to the authentication key. In another more secure scenario, the authentication indicia is related to the authentication key by a function. One example function for the more secure scenario is the authentication indicia is an authentication code which is related to the authentication key by a Kasumi function. For use herein, such a Kasumi function can be expressed as $C=\text{Kasumi}(M)_{AUTHENTICATIONKEY}$, wherein: M is a parameter derived from an identity of a mobile node; AUTHENTICATION KEY is a parameter derived from the authentication key; and C is the authentication indicia (e.g., the authentication code). Various techniques may be employed for deriving the parameter M and the AUTHENTICATION KEY parameter. For example, M can be derived from plural (e.g., two) concatenated instances of the U-RNTI of the mobile node; the AUTHENTICATION KEY parameter may be derived from plural (e.g., two) concatenated instances of the authentication key. As another example, M can instead be derived from either one or several concatenated instances of the binary representation of the core network (CN) UE identity, e.g., the IMSI of the mobile node. The binary representation of the IMSI can be constructed by concatenating the binary representation of each of the 15 digits (where each digit is represented by four bits) and padding with binary zeroes until the result becomes 64 bits. In yet another example, M is derived from plural (e.g. two) concatenated instances of either the TMSI or P-TMSI (each of them is 32 bits) of the mobile node. The CN UE identity may be particularly appropriate in a detach mode in which the U-RNTI is not available in the core network.

Upon receiving the authentication key included in the termination message (e.g., the connection release message or the detach message), the second node performs various actions. In this regard, the second node determines a calculated authentication indicia using the authentication key included in the termination message. The second node then confirms that the calculated authentication indicia represents the authentication indicia earlier provided to the second node by the first node.

In addition to pertaining to authentication methods briefly summarized above as well as communications networks implementing the same, the present invention also pertains to the nodes involved in such implementation, e.g., the first node which stores an authentication key and which uses the authentication key to derive an authentication indicia related to the authentication key, and the second node which confirms that the correct authentication indicia was included in the termination message. As indicated, in the release authentication mode of operation the first node can be a radio access network node (e.g., a radio network controller) and the second node can be mobile node (e.g., a user equipment unit). In the detach authentication mode, the first node is the mobile node (e.g., a user equipment unit) and the second node can be a core network node.

In an example implementation, the first node includes means for causing the authentication indicia to be provided to the second node; as well as an authentication unit which includes the authentication key in a termination message. The termination message is transmitted over an air interface between the first node and the second node.

In an example implementation, the second node includes an authentication unit which confirms that the authentication key included in the termination message is related to the authentication indicia as a condition for performing a termination operation. The authentication unit includes means for determining a calculated authentication indicia using an authentication key included in a termination message, and means for confirming that the calculated authentication indicia represents the authentication indicia stored in the memory as a condition for performing a termination operation. In the detach authorization mode, the second node (e.g., a core network node) includes a memory which stores an association of the mobile node with an authentication indicia (the authentication indicia having been transmitted from the mobile node over an air interface).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a diagrammatic view of example mobile communications system having authentication mechanisms according to a release authentication mode of operation.

FIG. 9A and FIG. 9B are diagrammatic views of example formats of example radio resource control (RRC) connection establish messages, and show fields or elements where an authentication release key or indicia can be included.

FIG. 10A–FIG. 10E are diagrammatic views of example formats of example radio resource control (RRC) connection release messages, and show fields or elements where an authentication release key or indicia can be included therein.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented in various ways.

Figure 1A:
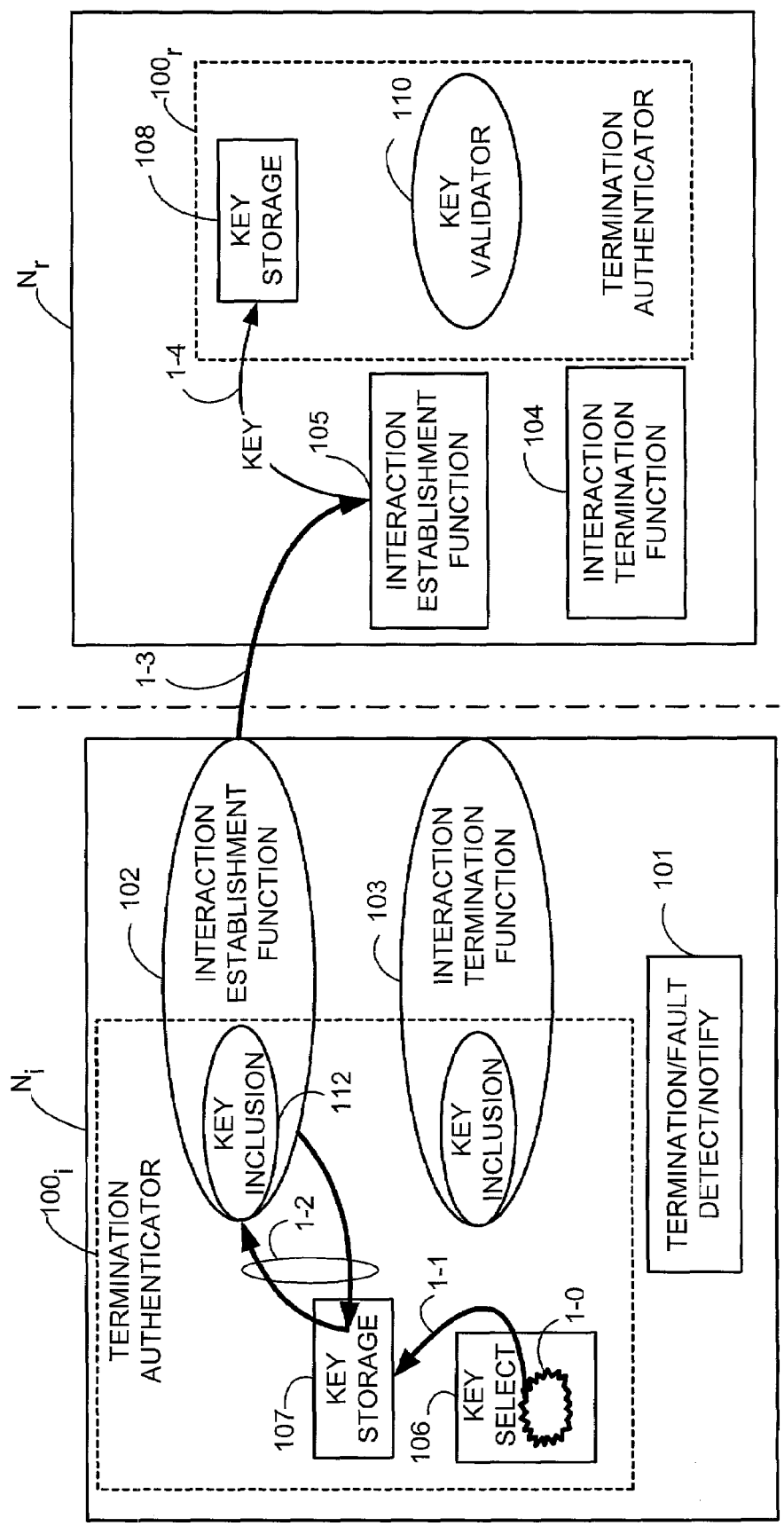
FIG. 1A is a diagrammatic view of two nodes of a communications system and basic actions involved in establishing interaction therebetween to an extent pertinent for illustrating operation of termination authentication according to a first example implementation.
Figure 1B:
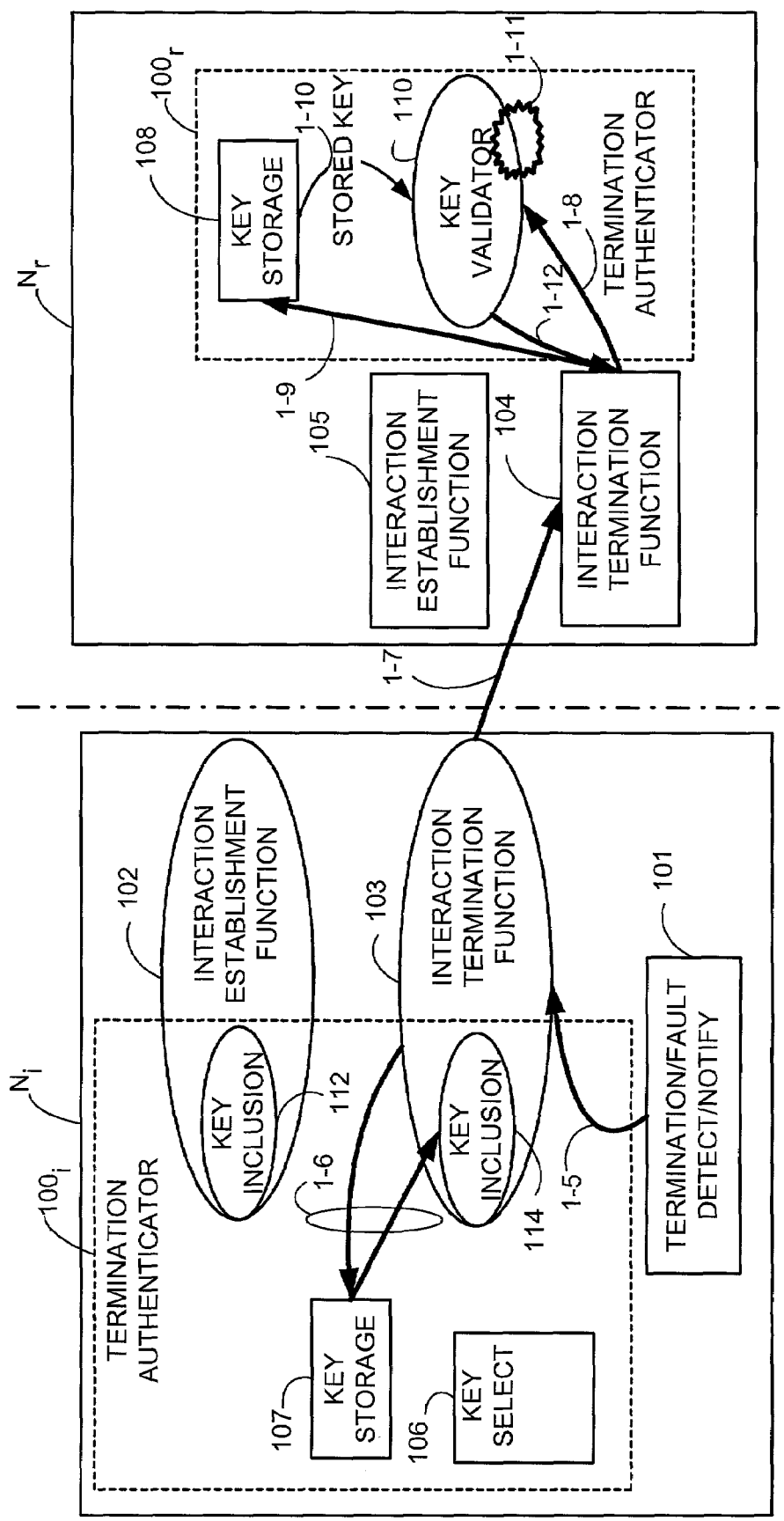
FIG. 1B is a diagrammatic view of the two nodes of a communications system and basic actions involved in terminating interaction therebetween to an extent pertinent for illustrating operation of termination authentication according to the first example implementation.

FIG. 1A and FIG. 1B show two nodes $N_i$ and $N_r$ of a communications network. The two nodes $N_i$ and $N_r$ communicate over an air interface depicted by the broken line in FIG. 1A and FIG. 1B. There may be intermediate nodes (such as a base station node) positioned or functionally intermediate the two nodes $N_i$ and $N_r$. One of the two nodes $N_i$ and $N_r$ is a mobile node, e.g., a wireless node sometimes referred to as a mobile station, mobile terminal, or user equipment unit. For sake of simplicity, the mobile node shall often hereinafter be referred to as the user equipment unit, although it should be understood that all the foregoing terms as well as other comparable terms are also appropriate. The other of the two nodes $N_i$ and $N_r$ is a fixed node involved in some sort of interaction with the mobile node. For example, this fixed node could be a node of a radio access network (RAN) or a node of a core network.

Of particular importance to the present invention is a termination process which terminates a particular aspect of the interaction in which the $N_i$ and $N_r$ participate. The termination process involves an authentication mechanism which renders the communications network, and thus the two nodes $N_i$ and $N_r$, impervious to unauthorized requests for termination or cessation of the interaction between the two nodes $N_i$ and $N_r$. As explained more fully subsequently, if the interaction between the two nodes $N_i$ and $N_r$ is a radio connection, in a release authentication mode of operation the authentication mechanism protects against an unauthorized connection release message directed to a mobile node of the network, thereby thwarting an attempt to request an unauthorized connection release procedure concerning a connection involving the mobile node. Similarly, in a detach authentication mode of operation also hereinafter elaborated, the authentication mechanism protects against an unauthorized detach message deceptively transmitted on behalf of a mobile node, thereby thwarting an attempt to request an unauthorized detach procedure for the mobile node.

The node $N_i$ is the termination request initiating node, and is shown in FIG. 1A and FIG. 1B as comprising a termination authenticator $100_i$ and a termination/fault detect/notify function 101. The node $N_r$ is the termination request responding node, which has its own version of a termination authenticator $100_r$. The termination authenticator $100_i$ works in conjunction with other functions of the node $N_i$, including termination/fault detect/notify function 101, interaction establishment function 102, and interaction termination function 103. Similarly, the termination authenticator $100_r$ works in conjunction with other functions of the node $N_r$, including interaction termination function 104 and interaction establishment function 105. It will be appreciated that the two nodes $N_i$ and $N_r$ both have numerous other functions not specifically described herein, but otherwise understood to the person skilled in the art in accordance with differing implementations.

In the embodiment of FIG. 1A and FIG. 1B, the termination authenticator $100_i$ includes a key selector 106 and key storage memory 107, while the termination authenticator $100_r$ includes key storage memory 108 and key validator $110_r$. These functional divisions are for providing an illustration of the operations of termination authenticator $100_i$ and termination authenticator $100_r$, and are not critical but rather exemplary. It will be appreciated that these functions can be distributed or allocated in various ways, including using one or more individual hardware circuits, using software functioning in conjunction with a suitably programmed digital microprocessor or general purpose computer, using an application specific integrated circuit (ASIC), and/or using one or more digital signal processors (DSPs).

Basic actions or steps shown in representative manner in FIG. 1 and FIG. 1B show how, in one example implementation, the termination authenticator $100_i$ and termination authenticator $100_r$ provide authentication so that the termination request-receiving node $N_r$ can be sure that a termination request message is true, i.e., comes from a proper node (e.g., node $N_i$). FIG. 1A shows basic actions involved in establishing interaction between node $N_i$ and node $N_r$ to the extent pertinent for illustrating operation of termination authenticator $100_i$ and termination authenticator $100_r$. FIG. 1B, on the other hand, shows basic actions involved in the termination of the interaction which are germane to termination authenticator $100_i$ and termination authenticator $100_r$.

As action 1-0, the key selector 106 node $N_i$ selects or otherwise obtains (e.g., is assigned) a termination authentication key. The termination authentication key can be (for example) a random number. As action 1-1, the authentication key is stored in key storage memory 107. The key storage memory 107 is a memory device (e.g., nonvolatile RAM or hard disk) that survives a reset of node $N_i$. In one aspect of implemenation, the authentication key is associated with a plurality of termination request-responding nodes, not just one node $N_r$. For example, in a mode in which the node $N_i$ is a radio access network (RAN) control node (e.g., RNC), the authentication key is associated with a group of UEs (or, all UEs having this RNC as the Serving RNC).

When interaction is to be established between node $N_i$ and node $N_r$, the interaction establishment function 102 of node node $N_i$ obtains the authentication key from key storage memory 107, as depicted by action 1-2. The authentication key is provided to a key inclusion routine 112 of interaction establishment function 102, which includes the authentication key in an interaction establishment message which is sent as action 1-3 from node $N_i$ to node $N_r$. The transmission of the interaction establishment message, with its included authentication key, is preferably on an encrypted channel. As action 1-4, the node $N_r$ stores the authentication key in its key storage memory 108 (which also is preferably a non-volatile memory).

FIG. 1B shows termination/fault detect/notify function 101 considerably subsequently sending, as action 1-5, a notification to interaction termination function 103 that the interaction with node $N_r$ (either node $N_r$ alone or a group of nodes to which node $N_r$ belongs) must be terminated. Upon receipt of such notification, as action 1-6 the interaction termination function 103 obtains the authentication key from key storage memory 107 (or key selector 106). The authentication key is provided to a key inclusion routine 114 of interaction termination function 103, which includes the authentication key in an interaction termination message which is sent as action 1-7 over the air interface from node $N_i$ to node $N_r$.

After receipt of the termination message sent as action 1-7, as action 1-8 the interaction termination function 104 forwards the just-received authentication key to key validator 110. In addition, as action 1-9 the interaction termination function 104 requests that the stored authentication key from key storage memory 108 of termination authenticator $100_r$ be sent as action 1-10 to key validator 110. As action 1-11, the key validator 110 compares in the authentication key received in the termination message (e.g., received in message 1-7) with its stored authentication key received previously and stored in key storage memory 108. If there is a match of the two keys at action 1-11, the interaction termination function 104 is so notified (action 1-12) so that the interaction termination function 104 of node $N_r$ considers the termination message of action 1-7 as authenticated, and proceeds with the termination. If there is no match at action 1-11, the termination message is not authenticated (because, e.g., possibly the termination message was sent by an intruder making a denial of service attack), and the node $N_r$ simply ignores the termination message.

A drawback of the implementation of FIG. 1A and FIG. 1B is that the authentication key is sent before it actually is used. An intruder could possibly make use of the authentication key, once obtained, to release the node $N_r$ anyway (either the node $N_r$ itself or a group of nodes including node $N_r$). For instance, if the node $N_r$ is a mobile node (e.g., user equipment unit), an intruder with a normal subscription can obtain the authentication release key from a UE since the UE stores the authentication key, and then use the key to release all other UEs that received the same key. A work-around could be that the key is stored in the UE in a way that the authentication key cannot easily be accessed, such as in a SIM card. But, in any case, such work-around is highly dependent on that the key is sent in beforehand on an encrypted channel. For instance, if the encryption is not activated, this work-around does not solve the problem.

Figure 2A:
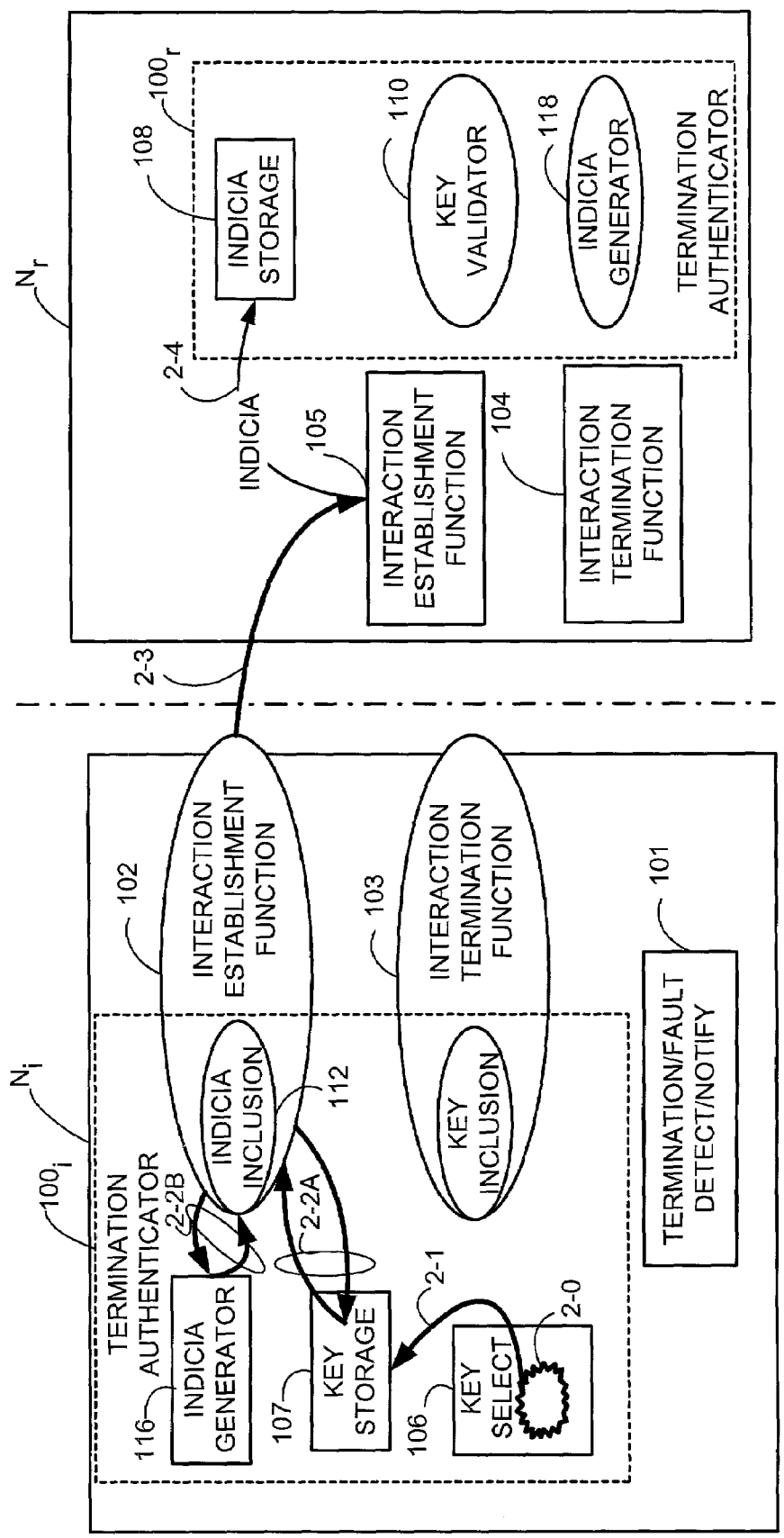
FIG. 2A is a diagrammatic view of two nodes of a communications system and basic actions involved in establishing interaction therebetween to an extent pertinent for illustrating operation of termination authentication according to a second example implementation.
Figure 2B:
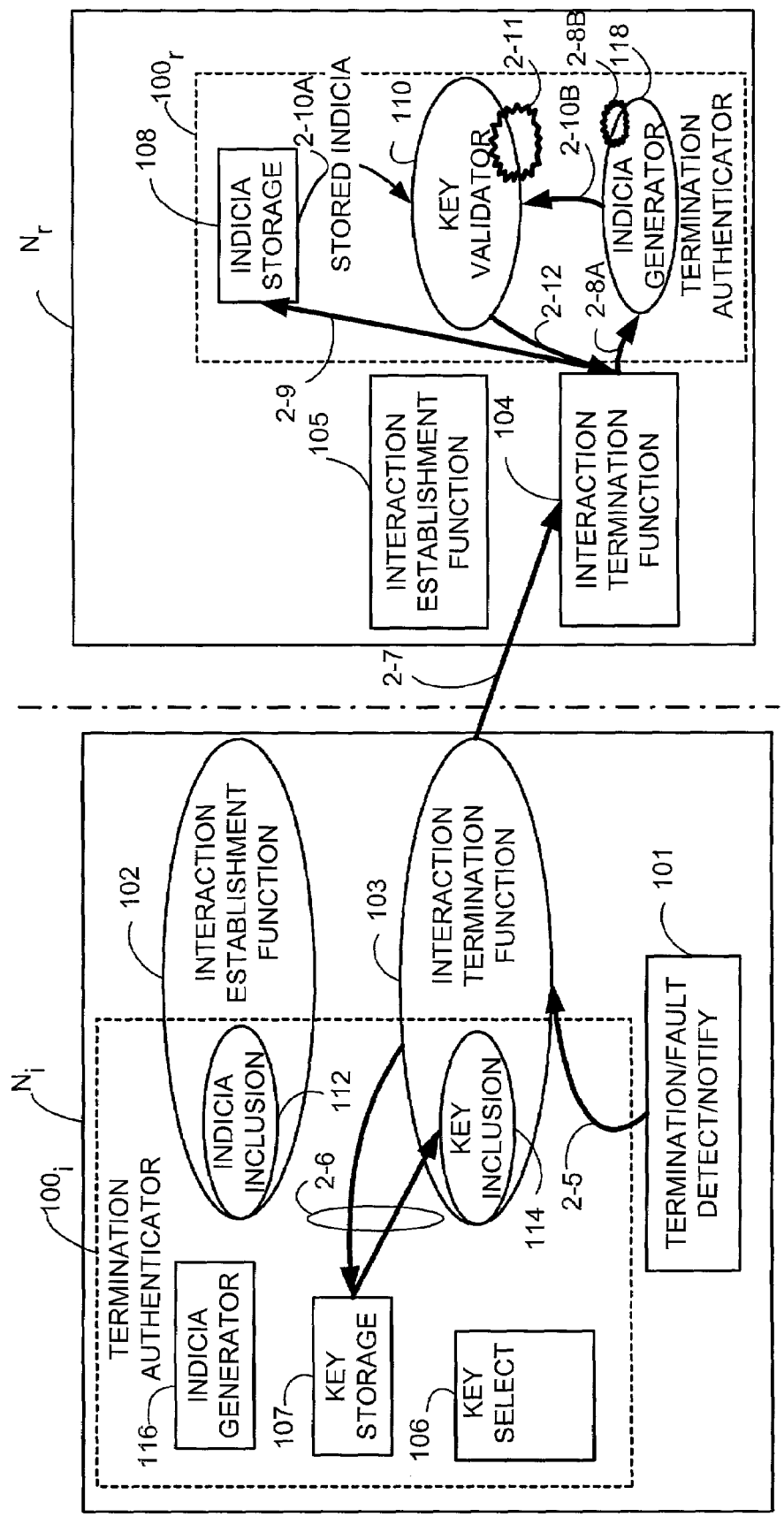
FIG. 2B is a diagrammatic view of the two nodes of a communications system and basic actions involved in terminating interaction therebetween to an extent pertinent for illustrating operation of termination authentication according to the second example implementation.

FIG. 2A and FIG. 2B therefore show an enhanced implementation, in which like-referenced elements keep the same numbers and like-referenced actions have similar suffix numerals. In the implementation of FIG. 2A and FIG. 2B, the key selector 106 of node $N_r$ selects (action 2-0) the authentication key as in the previous implementation, and stores (action 2-1) the authentication key in key storage memory 107. When interaction is to be established between node $N_i$ and node $N_r$, as action 2-2A the interaction establishment function 102 fetches the authentication key. Then, as action 2-2B, the interaction establishment function 102 uses the authentication key as an input to a indicia generator 116. The indicia generator 116 is preferably a one-way function, which outputs to the interaction establishment function 102 an authentication indicia or code. The authentication indicia is thus related to the authentication key by the function of indicia generator 116. The authentication indicia is provided to an indicia inclusion routine 112 of interaction establishment function 102, which includes the authentication indicia in an interaction establishment message which is sent as action 2-3 from node $N_i$ to node $N_r$. The transmission of the interaction establishment message, with its included authentication indicia, is preferably on an encrypted channel. As action 2-4, the node $N_r$ stores the authentication indicia in its indicia storage memory 108 (which also is preferably a nonvolatile memory).

As in the prior implementation, FIG. 2B shows termination/fault detect/notify function 101 considerably subsequently sending, as action 2-5, a notification to interaction termination function 103 that the interaction with node $N_r$ (either node $N_r$ alone or a group of nodes to which node $N_r$ belongs) must be terminated. Upon receipt of such notification, as action 2-6 the interaction termination function 103 obtains the authentication key from key storage memory 107 (or key selector 106). The authentication key is provided to a key inclusion routine 114 of interaction termination function 103, which includes the authentication key in an interaction termination message which is sent as action 2-7 over the air interface from node $N_i$ to node $N_r$.

After receipt of the termination message sent as action 2-7, as action 2-8A the interaction termination function 104 forwards the just-received authentication key to indicia generator 118. In addition, as action 2-9 the interaction termination function 104 requests that the stored authentication indicia from indicia storage memory 108 of termination authenticator $100_r$ be sent as action 2-10A to key validator 110.

As action 2-8B, indicia generator 118 uses the just-received authentication key (received in the termination message of action 2-7) to compute a corresponding indicia. In this respect, the indicia generator 118 of node $N_r$ operates on the same one-way function as indicia generator 116 of node $N_i$, so that if the proper authentication key were included in the termination message of action 2-7, the indicia generator 118 would compute the same authentication indicia as previously determined by indicia generator 116.

Action 2-10B shows indicia generator 118 forwarding to key validator 110 the indicia computed by indicia generator 118. As action 2-11, the key validator 110 compares in the authentication indicia computed by indicia generator 118 (based on the authentication key received in the termination message (e.g., received in message 2-7)) with the stored authentication indicia received previously and stored in indicia storage memory 108. If there is a match of the two indicia at action 2-11, the interaction termination function 104 is so notified (action 2-12), so that the interaction termination function 104 of node $N_r$ considers the termination message of action 2-7 as authenticated, and proceeds with the termination. If there is no match at action 2-11, the termination message is not authenticated and the node $N_r$ simply ignores the termination message.

From the foregoing, it can be seen that the implementation of FIG. 1A and FIG. 1B is a special (simplified) case of the more general implementation of FIG. 2A and FIG. 2B. In this regard, to realize the implementation of FIG. 1A and FIG. 1B, the indicia generator 116 can choose the actual authentication key as selected by key selector 106 to be the authentication indicia. In other words, in the implementation of FIG. 1A and FIG. 1B, the authentication indicia is related to the authentication key by being equal to the authentication key.

As mentioned above, in the implementation of FIG. 2A and FIG. 2B the authentication indicia is related to the authentication key by a function. One example function which outputs an authentication code which is related to the authentication key is a Kasumi function. Such a Kasumi function can be expressed as $C=Kasumi(M)_{AUTHENTICATION\ KEY}$, wherein: M is a parameter derived from an identity of the mobile node; AUTHENTICATION KEY is a parameter derived from the authentication key; and C is the authentication indicia (e.g., the authentication code). Various techniques may be employed for deriving the parameter M and the AUTHENTICATION KEY parameter. For example, M can be derived from plural (e.g., two) concatenated instances of the U-RNTI of the mobile node; the AUTHENTICATION KEY parameter may be derived from plural (e.g., two) concatenated instances of the authentication key. As another example, M can instead be derived from either one or several concatenated instances of the binary representation of the core network (CN) UE identity, e.g., the IMSI of the mobile node. The binary representation of the IMSI can be constructed by concatenating the binary representation of each of the 15 digits (where each digit is represented by four bits) and padding with binary zeroes until the result becomes 64 bits. In yet another example, M is derived from plural (e.g. two) concatenated instances of either the TMSI or P-TMSI (each of them is 32 bits) of the mobile node. The CN UE identity may be particularly appropriate in a detach mode in which the U-RNTI is not available in the core network.

For both the implementation of FIG. 1A/FIG. 1B and the implementation of FIG. 2A/FIG. 2B, there are two example modes of operation, as indicated previously. In a release authentication mode of operation, the authentication mechanism (e.g., the termination authenticator $100_i$ and termination authenticator $100_r$) protects against an unauthorized connection release message directed to a mobile node of the network, e.g., a mobile station such as a user equipment unit, thereby thwarting an attempt to request an unauthorized connection release procedure concerning a connection involving the mobile node. In a detach authentication mode of operation, the authentication mechanism protects against an unauthorized detach message deceptively transmitted on behalf of a mobile node, thereby thwarting an attempt to request an unauthorized detach procedure for the mobile node.

The two example modes can be practiced in various types of communication networks which involve an air interface, e.g., using various types of radio access networks. For sake of simplicity and only by way of example, the two modes are hereinafter described in the context of a universal mobile telecommunications (UMTS) 10 shown in FIG. 3 and FIG. 7. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node such as a Mobile Switching Center (MSC) node that provides circuit-switched services, while the Internet connectionless-oriented network 14 is connected through a Gateway General Packet Radio Service (GPRS) support node (GGSN) to a General Packet Radio Service (GPRS) Service (SGSN) node, the latter being tailored to provide packet-switched type services.

Figure 7:
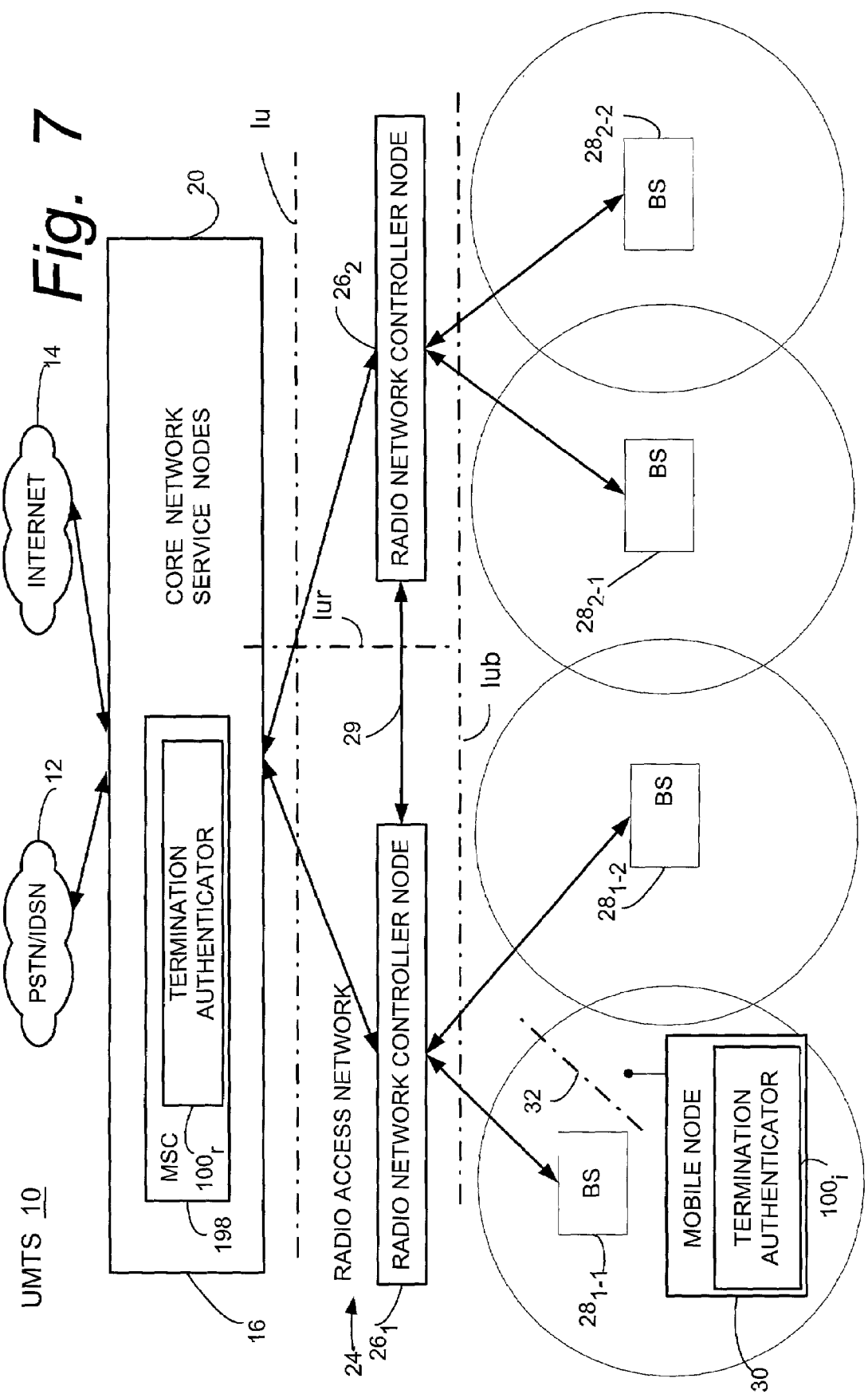
FIG. 7 is a diagrammatic view of example mobile communications system having authentication mechanisms according to a detach authentication mode of operation.

Each of the core network service nodes connects to a UMTS Terrestrial Radio Access Network (UTRAN) 24 over a radio access network (RAN) interface referred to as the Iu interface. UTRAN 24 includes one or more radio network controllers (RNCs) 26 and one or more base stations (BS) 28. For sake of simplicity, the UTRAN 24 of FIG. 3 and FIG. 7 is shown with only two RNC nodes, particularly RNC $26_1$ and RNC $26_2$. Each RNC 26 is connected to one or more base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 3 and FIG. 7 show that an RNC can be connected over an Iur interface to one or more other RNCs in the UTRAN 24. Further, those skilled in the art will also appreciate that a base station is sometimes also referred to in the art as a radio base station, a node B, or B-node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A user equipment unit (UE), such as user equipment unit (UE) 30 shown in FIG. 3 and FIG. 7, communicates with one or more cells or one or more base stations (BS) 28 over a radio or air interface 32. Each of the radio interface 32, the Iu interface, the Iub interface, and the Iur interface are shown by dash-dotted lines in FIG. 3 and FIG. 7.

Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

Different types of channels may exist between one of the base stations 28 and user equipment units (UEs) 30 for transport of control and user data. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). The forward access channel (FACH) is also used to carry user data. In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Dedicated channels (DCH) may be allocated to carry substantive call communications with a user equipment unit (UE).

Figure 4:
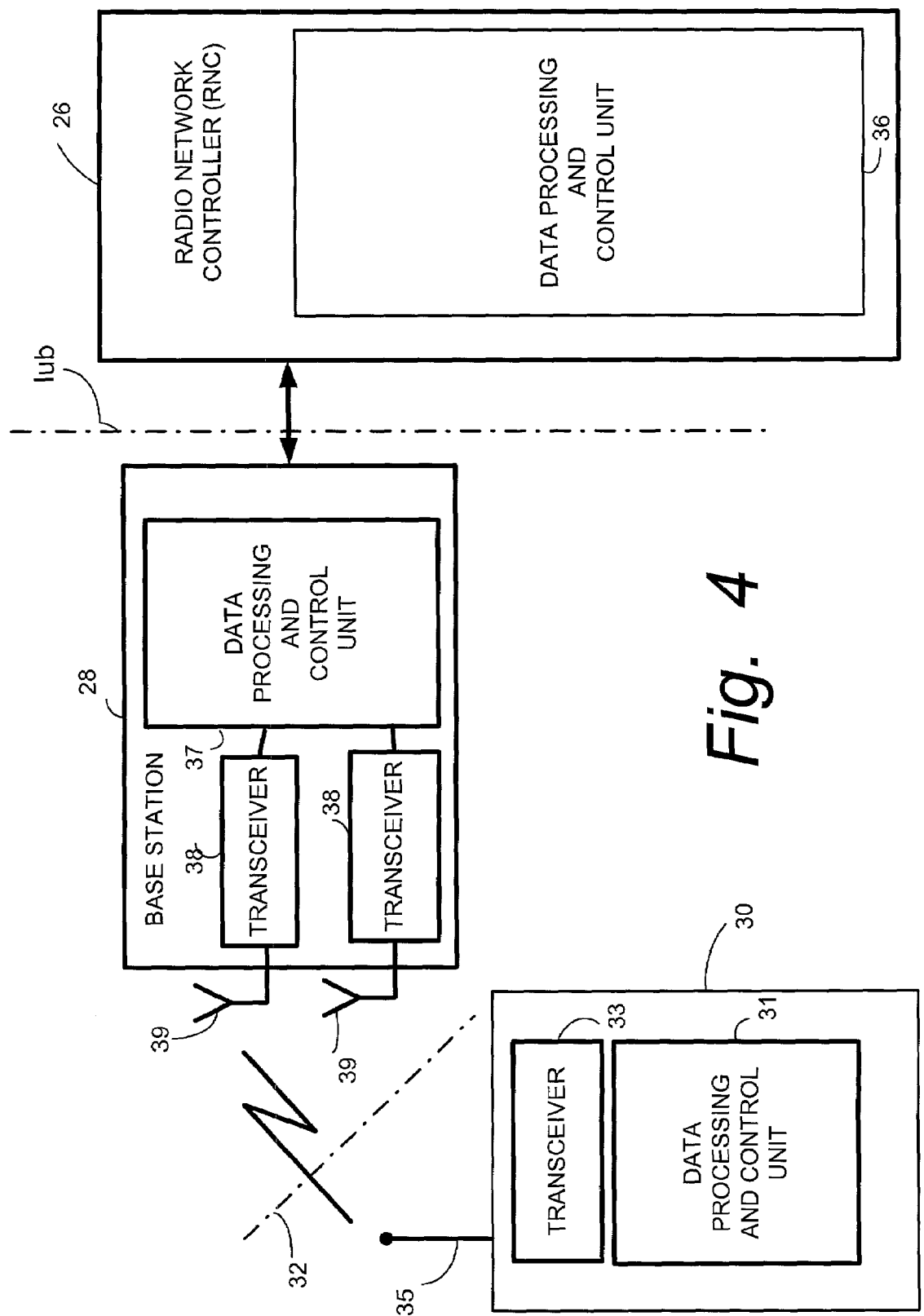
FIG. 4 is diagrammatic view showing, in more detailed, portions of a representative implementation of the example mobile communications system of FIG. 3.

FIG. 4 shows selected general aspects of user equipment unit (UE) 30 and illustrative nodes such as radio network controller 26 and base station 28. The user equipment unit (UE) 30 shown in FIG. 4 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 4 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

FIG. 3 illustrates an example of the release authentication mode of operation. In the illustrated example release authentication mode, a radio access network control node serves as the first node or node $N_i$, i.e., the node which provides the authentication indicia/key and which issues the termination message. To this end, FIG. 3 shows radio network controller (RNC) $26_1$ as including the termination authenticator $100_i$ and the mobile node or user equipment unit 30 as including the termination authenticator $100_r$.

Figure 5A:
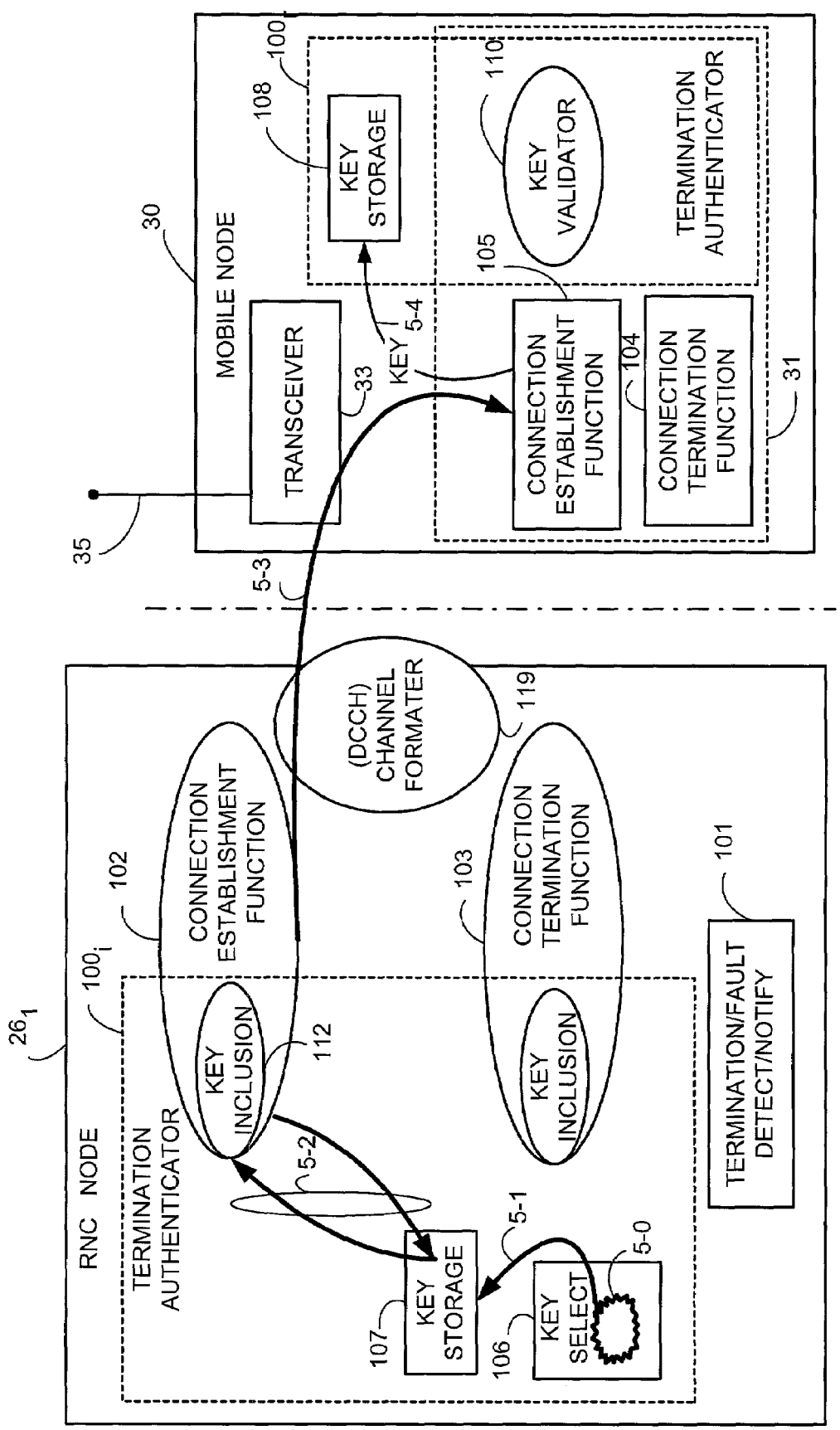
FIG. 5A and FIG. 5B illustrate an example manner for carrying out the release authentication mode of operation using the implementation of FIG. 1A and FIG. 1B.
Figure 5B:
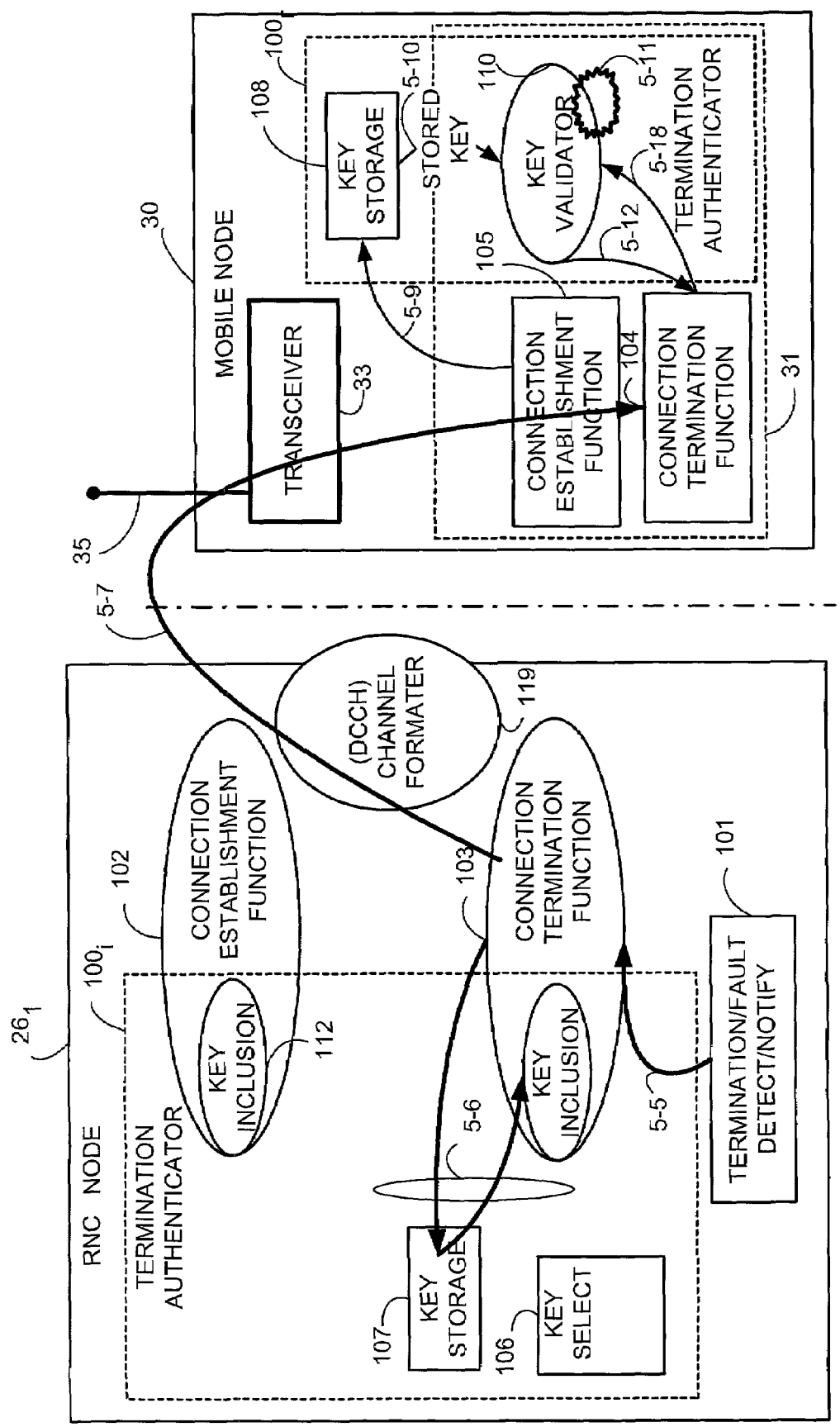

FIG. 5A and FIG. 5B illustrate an example manner for carrying out the release authentication mode of operation using the implementation of FIG. 1A/FIG. 1B. In FIG. 5A and FIG. 5B, the radio access network node (e.g., radio network controller (RNC) $26_1$) provides the authentication indicia to the mobile node (e.g., user equipment unit 30) in a first radio resource control (RRC) message (e.g., a radio resource control (RRC) connection establish message), and includes the authentication key in a second radio resource control (RRC) message (e.g., a radio resource control (RRC) connection release message). The user equipment unit 30 confirms that the authentication key included in the second radio resource control (RRC) message is related to the authentication indicia as a condition for performing the connection release operation.

In FIG. 5A and FIG. 5B, like-referenced elements keep the same numbers and like-referenced actions have similar suffix numerals as in FIG. 1A and FIG. 1B, respectively. In FIG. 5A and FIG. 5B, the authentication key is an authentication release key which is associated the user equipment unit 30 or with a group of user equipment units (or, all UEs having this RNC $26_1$ as the Serving RNC). The authentication release key is selected (action 5-0), stored in a way that survives a reset of the RNC $26_1$ (action 5-1), and fetched (action 5-2) for inclusion in a connection establishment message sent to user equipment unit 30 in conjunction with a connection establishment procedure.

In FIG. 5A and FIG. 5B, the connection establishment procedure, with its sending of an appropriate connection establishment message, is repeated for each user equipment unit, typically at establishment of the RRC connection and at all times the U-RNTI for a UE is changed, such as SRNC relocation. In the illustrated example, the connection establishment message is a resource control (RRC) connection establish message. The authentication release key is sent on an encrypted channel, e.g., the dedicated control channel (DCCH). To this end, FIG. 5A and FIG. 5B show a (DCCH) channel formatter 119 which comprises radio network controller (RNC) $26_1$ as being involved in the transmission of the connection establishment message of action 5-3. When the user equipment unit 30 receives the authentication release key, the user equipment unit 30 stores the authentication release key in key storage memory 108.

When radio network controller (RNC) $26_1$ needs to release one or several user equipment units on the CCCH or the PCCH (e.g. after the RNC has undergone reset when UE contexts were lost), the radio network controller (RNC) $26_1$ includes the authentication release key in the release message depicted as action 5-7. As mentioned above, the release message can be a radio resource control (RRC) connection release message.

When the user equipment unit 30 receives the release message of action 5-7, the key validator 110 compares in the release message-received authentication release key with its stored authentication release key received previously, as understood in conjunction with the previous description of FIG. 1B. If there is a match, the user equipment unit 30 considers the message as authenticated and proceeds with the release (i.e. enters idle mode). If there was no match, the release is not authenticated and the user equipment unit simply ignores the message.

Figure 6A:
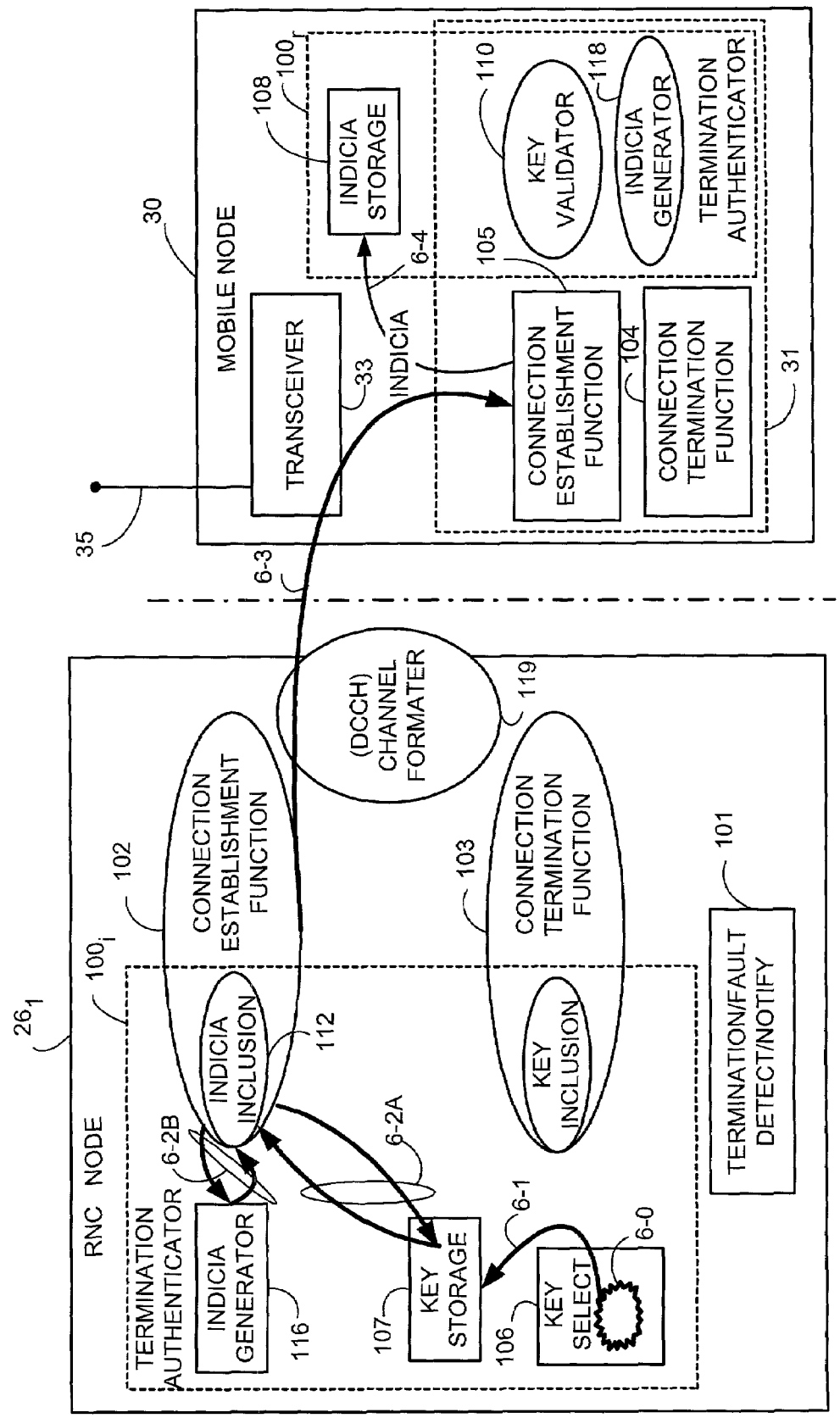
FIG. 6A and FIG. 6B illustrate an example manner for carrying out the release authentication mode of operation using the implementation of FIG. 2A and FIG. 2B.
Figure 6B:
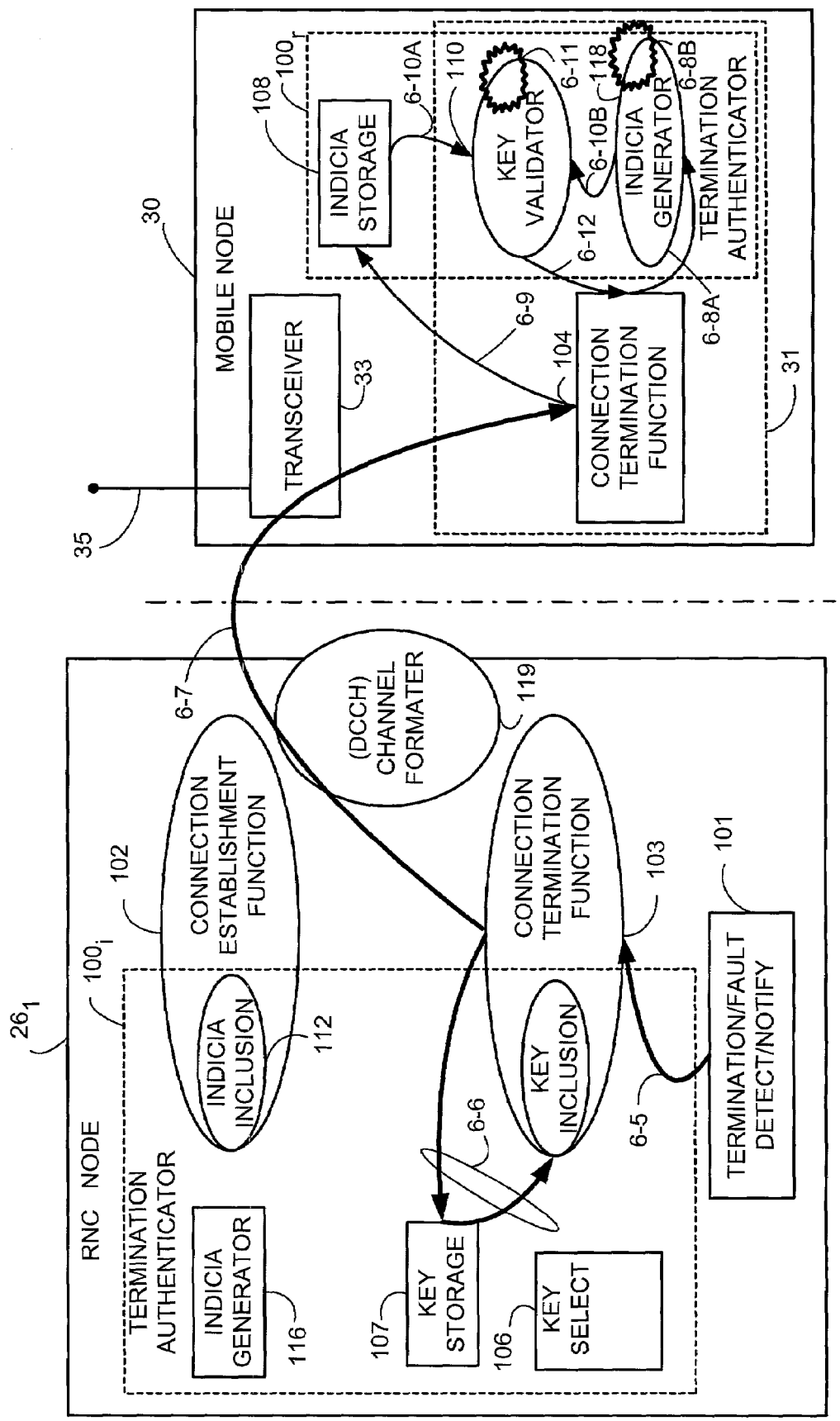

FIG. 6A and FIG. 6B illustrate an example manner for carrying out the release authentication mode of operation using the implementation of FIG. 2A/FIG. 2B. Again in FIG. 6A and FIG. 6B, the radio access network node (e.g., radio network controller (RNC) $26_1$) provides the authentication release indicia to the mobile node (e.g., user equipment unit 30), and includes the authentication release key in a second radio resource control (RRC) message (e.g., a radio resource control (RRC) connection release message). The user equipment unit 30 confirms that the authentication release key included in the second radio resource control (RRC) message is related to the authentication release indicia as a condition for performing the connection release operation.

In FIG. 6A and FIG. 6B, like-referenced elements keep the same numbers and like-referenced actions have similar suffix numerals as in FIG. 2A and FIG. 2B, respectively. In FIG. 6A and FIG. 6B, the authentication release indicia is associated one user equipment unit with a group of user equipment units (or, all UEs having this RNC $26_1$ as the Serving RNC). The authentication release key is selected (action 6-0) and stored in a way that survives a reset of the RNC $26_1$ (action 6-1).

When a RRC connection is established to a given user equipment unit such as user equipment unit 30, the serving RNC $26_1$ assigns a U-RNTI to the user equipment unit 30. As previously explained, the U-RNTI (UTRAN Radio Network Temporary Identity) is a global identity which identifies the user equipment unit 30 for the UTRAN. The SRNC $26_1$ uses the authentication release key (fetched at action 6-2A) together with the U-RNTI as input (see action 6-2B) to the indicia generator 116. The indicia generator 116 is a one-way function F which uses the U-RNTI and the authentication release key to generate the authentication release indicia. The authentication release indicia serves as a UE individual authentication release code. The one-way function F of indicia generator 116 is designed in a way that the authentication release key can not be derived from the U-RNTI and the UE individual authentication release code.

The indicia inclusion routine 112 includes the authentication release indicia in a connection establishment message sent to user equipment unit 30 in conjunction with an appropriate procedure or at an appropriate juncture. Such appropriate procedures/junctures include (for example) the following: a connection establishment procedure; each time a new U-RNTI is re-assigned (using, e.g., the UTRAN Mobility Information message or Transport Channel Reconfiguration message); after ciphering was started, but not in conjunction with re-assignment of a U-RNTI, typically using the UTRAN Mobility Information message. In the illustrated example embodiment, the connection establishment message depicted by action 6-3 is a radio resource control (RRC) message (e.g., a radio resource control (RRC) connection establish message). As in FIG. 5A and FIG. 5B, the authentication release indicia is sent on an encrypted channel, e.g., the dedicated control channel (DCCH). Therefore, FIG. 6A and FIG. 6B also show a (DCCH) channel formatter 119 which comprises radio network controller (RNC) $26_1$ as being involved in the transmission of the connection establishment message of action 6-3. When the user equipment unit 30 receives the authentication release indicia, the user equipment unit 30 stores the authentication release indicia in indicia storage memory 108.

Thus, the radio network controller (RNC) $26_1$ sends the authentication release indicia, which serves as the UE individual authentication release code, to the user equipment unit 30. As in FIG. 5A and FIG. 5B, this procedure with its transmission of the UE individual authentication release code is repeated for each user equipment unit, and is typically performed shortly after the establishment of the RRC connection (that is, when the U-RNTI is assigned the first time) for the respective UE, and at all times the U-RNTI for a UE is changed (such as SRNC relocation). The UE individual key should be sent on an encrypted channel, e.g., the dedicated control channel (DCCH). If the channel is not encrypted, an integrity protection unit can be used to preclude a man-in-the-middle from acting as a false base station by assigning false UE individual authentication release codes (can also be combined with encryption). In any case, there is a choice by the SRNC to use encryption or not when sending the UE individual authentication release code.

When the RNC needs to release one or several UEs on the CCCH or the PCCH (e.g. after an RNC reset when UE contexts were lost), in like manner as FIG. 2B the radio network controller (RNC) $26_1$ includes the authentication release key in the release message (action 6-7). When the user equipment unit 30 receives the release message of action 6-7, the key validator 110 of user equipment unit 30 uses the authentication release key and the U-RNTI as input (see action 6-8A) to indicia generator 118 which, it will be recalled, is a one-way function F which gives an UE individual authentication release code (e.g., authentication release indicia) as an output. As action 6-11, the key validator 110 of user equipment unit 30 then compares the calculated UE individual authentication release code (obtained from indicia generator 118 and applied as action 6-10B to key validator 110) with its stored UE individual authentication release code received previously. If there is a match at key validator 110, the user equipment unit 30 considers the message as authenticated and proceeds with the release (i.e. enters idle mode). If there was no match, the release is not authenticated and the user equipment unit 30 simply ignores the message of action 6-3.

FIG. 7 illustrates an example of the detach authentication mode of operation. In the detach authentication mode of operation, in one example implementation the first node (which provides the authentication indicia to the second node of the network) is a mobile node (e.g., a user equipment unit 30) and the second node is a core network node (e.g., a MSC). Thus, in the illustrated example detach authentication mode, the user equipment unit or mobile node serves as the first node or node $N_i$, i.e., the node which provides the authentication indicia/key and which issues the detach message. To this end, FIG. 7 shows user equipment unit 30 as including the termination authenticator $100_i$ and the MSC node 190 as including the termination authenticator $100_r$.

In the detach authentication mode, the mobile node can provide the authentication indicia to the core network upon occurrence of a predetermined event (e.g., registration of the mobile node with the core network). Thereafter, when initiating a detach operation, the mobile node 30 includes the authentication key, e.g., in a detach message (for example, an IMSI detach indication message). As a condition for performing its part of the detach operation, the core network node first confirms that the authentication key communicated to the core network node in the detach message is related to the previously-received authentication indicia. In one implementation, the mobile node uses the IMSI or the TMSI of the mobile node to generate the authentication indicia which is provided to the core network, and likewise the core network node uses the IMSI or the TMSI of the mobile node to confirm that the authentication key is related to the authentication indicia.

Figure 8A:
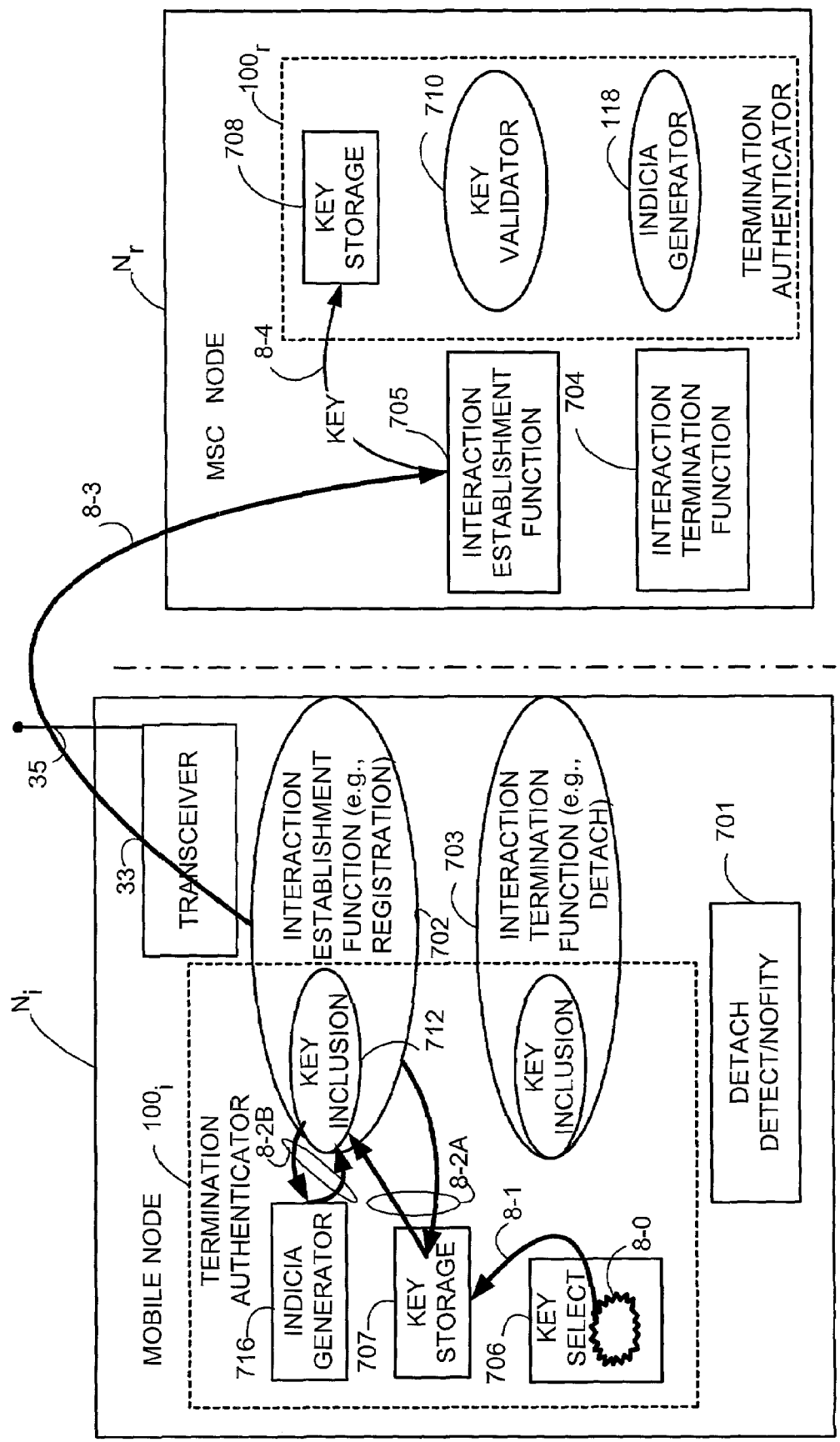
FIG. 8A and FIG. 8B illustrate an example manner for carrying out the detach authentication mode of operation using the implementation of FIG. 2A and FIG. 2B.
Figure 8B:
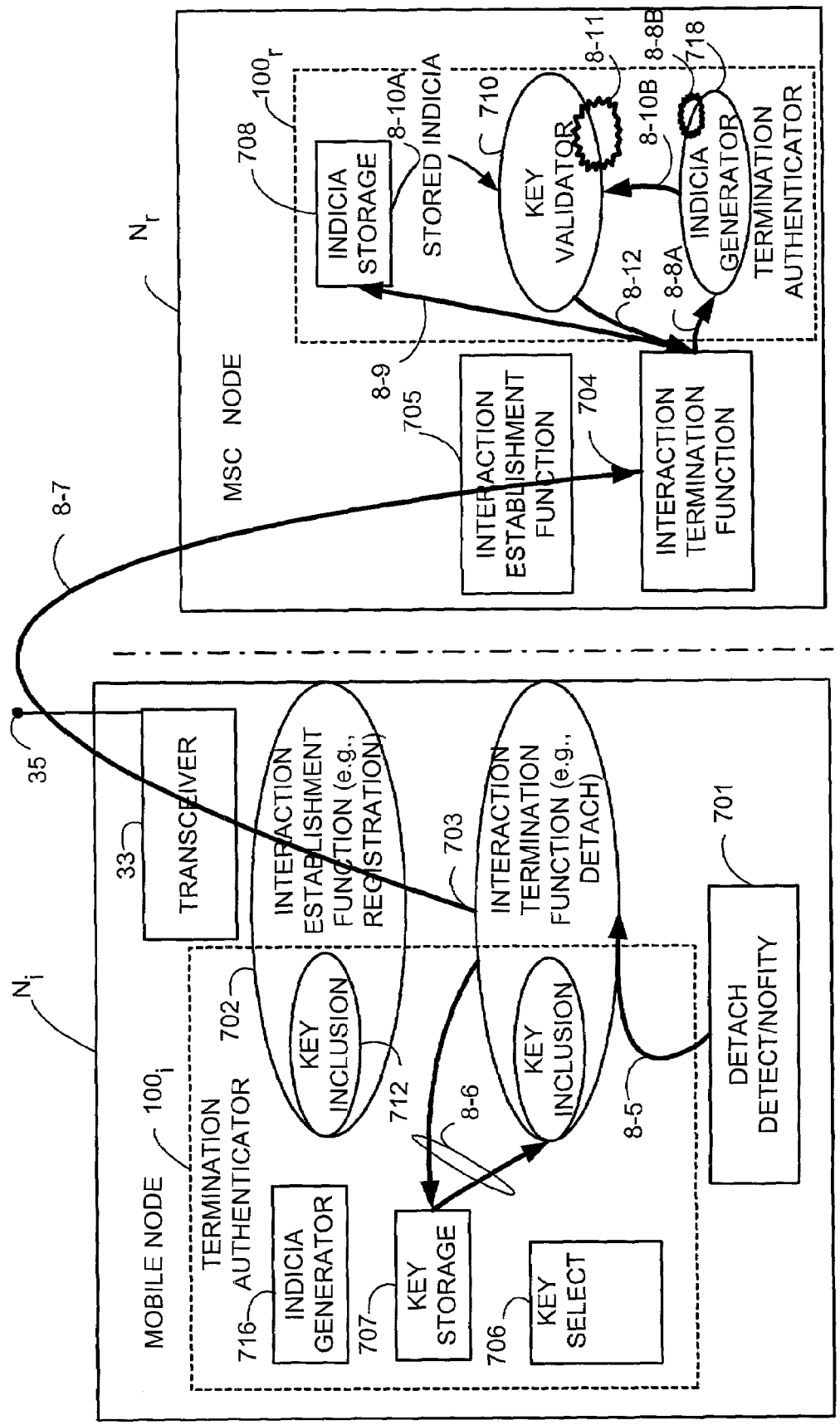
Figure 11:
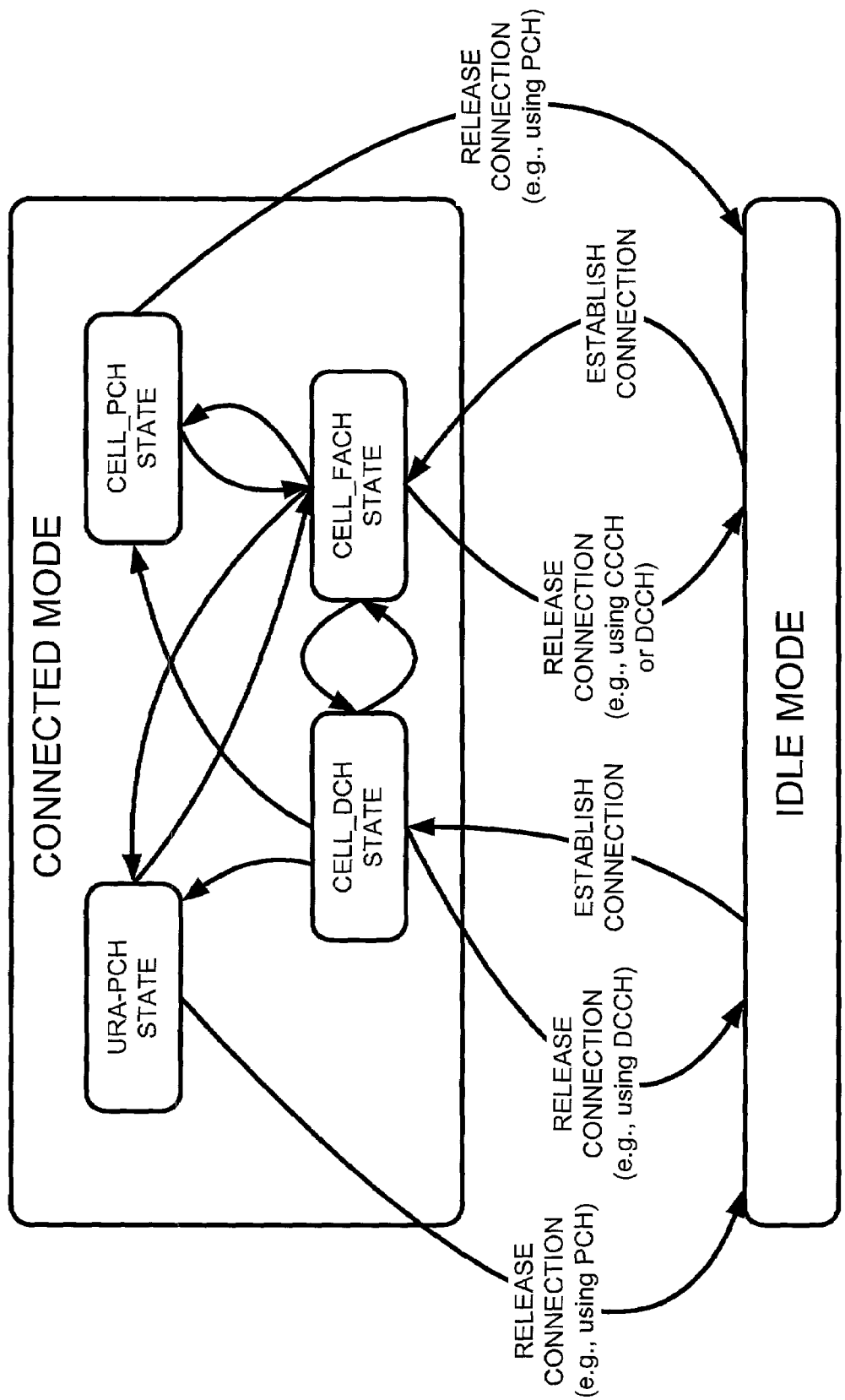
FIG. 11 is a diagrammatic view showing modes and states of a user equipment unit (UE) pertinent to the present invention.

As shown in more detail in FIG. 8A and FIG. 8B, the termination authenticator $100_i$ of user equipment unit 30 works in conjunction with other functions of user equipment unit, including detach detect/notify function 701, interaction establishment (registration) function 702, and interaction termination (detach) function 703. Similarly, the termination authenticator $100_r$ works in conjunction with other functions of MSC node 198, including interaction termination function 704 and interaction establishment function 705. Again, it will be appreciated that both user equipment unit 30 and MSC node 198 have numerous other functions not specifically described herein, but otherwise understood to the person skilled in the art.

In the embodiment of FIG. 8A and FIG. 8B, the termination authenticator $100_i$ includes a key selector 706, key storage memory 707, and indicia generator 716, while the termination authenticator $100_r$ includes key storage memory 708, key validator 710, and indicia generator 718. Once again, these functional divisions are for providing an illustration of the operations of termination authenticator $100_i$ and termination authenticator $100_r$, and are not critical but rather exemplary. It will again be appreciated that these functions can be distributed or allocated in various ways, including using one or more individual hardware circuits, using software functioning in conjunction with a suitably programmed digital microprocessor or general purpose computer, using an application specific integrated circuit (ASIC), and/or using one or more digital signal processors (DSPs).

Except as specifically explained hereinbelow, the operations of the termination authenticator $100_i$ and termination authenticator $100_r$ in the detach authentication mode of operation are generally analogous to those of previous embodiments. In general, the operations of various components and functionalities are comparable to respective elements of prior embodiments having the same two lower order digit reference numerals. For sake of brevity, only an implementation of the detach authentication mode according to the implementation of FIG. 2A and FIG. 2B is described, particularly with reference to FIG. 8A and FIG. 8B. As will be recalled, the implementation of FIG. 2A and FIG. 2B includes generation and transmission of the authentication termination indicia, which in FIG. 8A and FIG. 8B correspond to the authentication detach indicia. It will readily be understood how the detach authentication mode can be implemented using FIG. 1A and FIG. 1B (in which the authentication detach indicia is equal to the authentication detach key).

In case of FIG. 8A and FIG. 8B, the key selector 706 of user equipment unit 30 as action 8-0 selects the authentication detach key. The authentication detach key is stored in key storage memory 707 (action 8-1). As action 8-2A the interaction establishment function 702 fetches the authentication detach key from key storage memory 707 (or key selector 706) and the provides indicia generator 716 with the UE identity (such as IMSI or TMSI) and the authentication detach key, obtaining in return (see action 8-2B) a termination indicia. In the detach authentication mode, the termination indicia is the authentication detach code, which serves as an UE individual authentication detach code.

As in like manner with certain previous embodiments, the indicia generator 716 is a one-way function F. In FIG. 8A and FIG. 8B, the indicia generator 716 receives, as input, both the authentication detach key and the UE identity (such as IMSI or TMSI) to calculate the UE individual authentication detach code.

At some predetermined point in time, e.g. during a registration procedure in which user equipment unit 30 registers with the core network, the UE individual authentication detach code (e.g., authentication detach index) is transmitted to the core network, e.g. during the registration procedure. In keeping with this example and using registration as the predetermined event to cause transmission of the detach authentication indicia (code), FIG. 8A shows transmission of the detach authentication indicia (code) as action 8-3 in a user equipment unit registration message. Upon receipt of the message of action 8-3 at the core network, e.g., at MSC node 198, the UE individual detach authentication indicia (code) is stored in indicia storage memory 708.

When detach detect/notify function 101 determines that the user desires that a detach operation be performed (e.g., the user powers down the user equipment unit 30), as action 8-5 (see FIG. 8B) the interaction termination function 703 is so notified. The interaction termination function 703 prepares a detach message (such as an IMSI DETACH INDICATION message, for example), and in doing so as action 8-6 retrieves the detach authentication key from key storage memory 707. The detach authentication key is included in the detach message sent as action 8-7.

Figure 13:
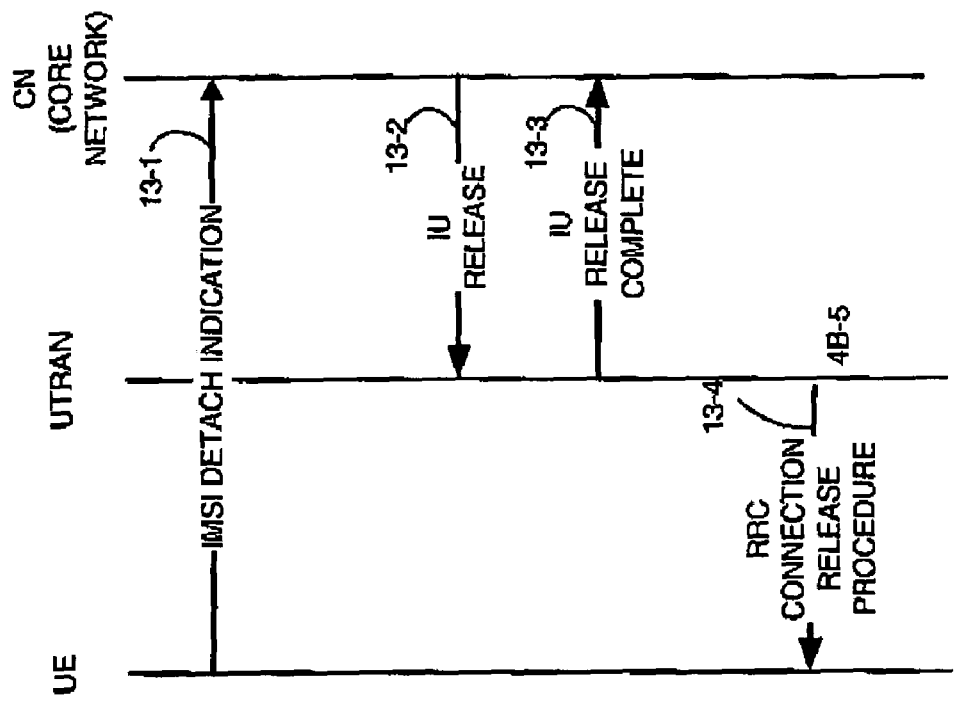
FIG. 13 is a diagrammatic view showing basic aspects of a conventional detach procedure.
Figure 12:
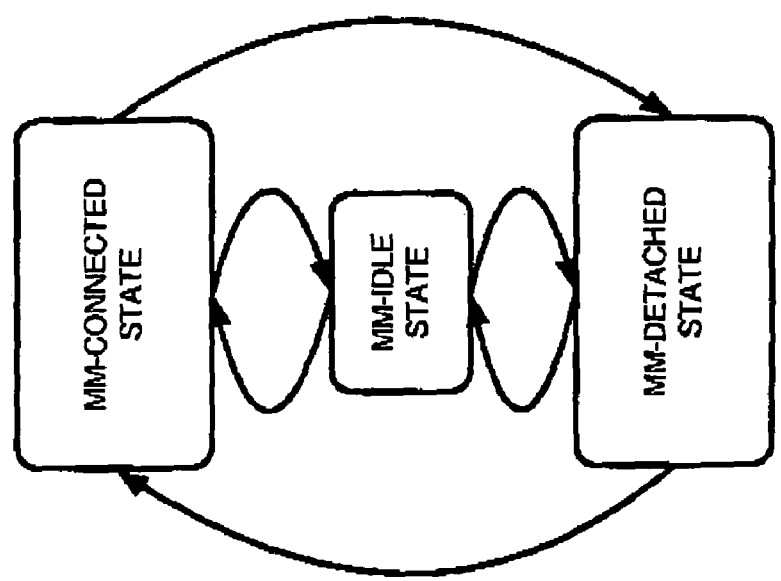
FIG. 12 is a diagrammatic view showing states of mobility management (MM) protocol pertinent to the present invention.

When the core network node (e.g., MSC node 198) receives the IMSI DETACH INDICATION message of action 8-7, as action 8-8A the core network node uses the authentication detach key as one input to indicia generator 718 (the one-way function F) together with the UE identity (such as IMSI or TMSI). As action 8-8B, the indicia generator 718 calculates an UE individual authentication detach code, which is sent to key validator 710 as action 8-10B. The calculated UE individual authentication detach code is compared as action 8-11 by key validator 710 to the stored UE individual authentication detach code obtained as action 8-10A from key storage memory 708. If key validator 710 determines that there is a match, the MSC node 198 continues with the radio connection release procedure (including marking the UE as detached). If no match is determined by key validator 710, MSC node 198 ignores the detach message of action 8-7, i.e. the registration status of the user equipment unit 30 is not changed, and the MSC node 198 continues with the radio connection release procedure (see FIG. 13).

The indicia generators described above, which serve as a one-way function F, can be implemented in a number of different ways. As one example, the indicia generators are is implemented using a Kasumi block-cipher function such as that described in 3GPP TS 35.202: $3^{rd}$ Generation Partnership Project; Technical Specification Group Services and Systems Aspect; 3G Security; Specification of the 3GPP Confidentiality and Integrity Algorithms; Document 2: KASUMI Specification. Encrypting a message, consisting of a block of bits, is defined in Expression 1.

$$C = \text{KASUMI}(M)_{KEY} \quad \text{Expression 1:}$$

In Expression 1, M is normally a message, when KASUMI is used as an encryption function. C is the output, normally the encrypted message. KEY is the key under which the message is encrypted. C and M are 64 bit quantities, and KEY is a 128 bit quantity.

The indicia generators of the present invention do not use the Kasumi block-cipher function to encrypt a message. Rather, the indicia generators use the Kasumi block-cipher function in accordance with Expression 1 in the following way:

M is constructed from an identity of the mobile node. For example, M can be derived from plural (e.g., two) concatenated instances of the U-RNTI of the mobile node. As M is a 64 bit quantity and U-RNTI is a 32 bit quantity, M comprises plural (e.g., two) concatenated instances of the identity of the mobile node. As another example, M can instead be derived from either one or several concatenated instances of the binary representation IMSI of the mobile node. The binary representation of the IMSI can be constructed by concatenating the binary representation of each of the 15 digits (where each digit is represented by four bits) and padding with binary zeroes until the result becomes 64 bits. In yet another example, M is derived from plural (e.g. two) concatenated instances of either the TMSI or P-TMSI (each of them is 32 bits) of the mobile node.

KEY is constructed from the authentication detach key or the authentication release key. As these keys are 64 bit quantities, KEY is constructed of plural (e.g., two) concatenated instances of the authentication detach key or the authentication release key.

The resulting C is used as the UE individual authentication detach code or UE individual authentication release code, and is a 64 bit quantity.

An important advantage of using the Kasumi function is that this function is already supported by existing mobile terminals and networks since it is used to perform encryption and integrity protection. It is to be noted that 64 bits for the keys and codes is currently viewed as a reasonable length, both from security and radio interface overhead point of view. As a brief analysis of an exhaustive key search attack, consider the fact that currently an ordinary PC can typically encrypt 80 Mbit/s using Kasumi, assume 128 Mbit for an upper bound. At 64 bits per block, this yields around $2*10^6$ blocks per second. Changing the key every 24 hours, and assuming that the right key is found after half the key space is searched, this yields Expression 2.

$$2^{\wedge}\text{length(key)} * \tfrac{1}{2} * 1/(2*10^{\wedge}6) >= 24h \quad \text{Expression 2:}$$

Solving Expression 2 for length(key) yields Expression 3.

$$\text{length(key)} >= 38 \text{ bits.} \quad \text{Expression 3:}$$

That is, a key length of 38 bits is necessary for a marginally secure system. A key length of 64 bits gives a margin of 26 bits, or 67*10^6, which is considered secure enough. Even stronger protection will be the result of using a longer key, e.g. using the full 128 bits key space available in Kasumi. Also, a longer code (such as 128 bits) can be used. In that case, the keys and codes may be conveyed in two steps. The first part of the key (or code) is sent in one message and the second part in a message, sent later. When the mobile has received both parts, they are concatenated and used as input to the one-way function.

It is to be noted that UEs will receive paging even after RNC reset and therefore terminated calls and packets can be routed to the UEs.

With the authentication mechanisms described above, it will be harder for an intruder to release radio connections. Only the trusted communications network, e.g., UTRAN, will have the ability to release connections, thereby providing better protection from denial-of-service attacks.

The authentication mechanisms described above also make it harder for an intruder to detach a user equipment unit. Only the user equipment unit itself will have the ability to indicate detach towards the core network. All active user equipment units will receive paging and therefore terminating calls and packets can be routed to the user equipment units.

In FIG. 5A/FIG. 5B and FIG. 6A/FIG. 6B, the radio access network node (e.g., radio network controller (RNC) 26$_1$) provides the authentication release key (in the case of FIG. 5A/FIG. 5B) or the authentication release indicia (in the case of FIG. 6A/FIG. 6B) to the mobile node (e.g., user equipment unit 30) in a first radio resource control (RRC) message (e.g., a radio resource control (RRC) connection establish message), and includes the authentication key in a second radio resource control (RRC) message (e.g., a radio resource control (RRC) connection release message).

FIG. 9A and FIG. 9B illustrate an example format of example radio resource control (RRC) connection establish messages, and show fields or elements where the authentication release key (in the case of FIG. 5A/FIG. 5B) or the authentication release indicia (in the case of FIG. 6A/FIG. 6B) can be included therein.

FIG. 10A–FIG. 10E illustrate example formats of example radio resource control (RRC) connection release messages, and show fields or elements where the authentication release key (in the case of FIG. 5A/FIG. 5B) or the authentication release indicia (in the case of FIG. 6A/FIG. 6B) can be included therein.

As shown in FIG. 9A, the connection establishment message (RRC CONNECTION SETUP) includes typically (among other things) the following information elements: UE CN identity (9A-1); U-RNTI (9A-2); authentication release indicia (9A-K); and, channel assignment information (9A-3).

As shown in FIG. 9B, the UTRAN MOBILITY INFORMATION message includes (among other things) the following information elements: New U-RNTI (9B-1); authentication release indicia (9B-K); and, location area identity (9B-2).

As shown in FIG. 10A, the RRC CONNECTION RELEASE message (when used on the CCCH to release a group of UEs) includes typically (among other things) the following information elements: U-RNTI group (10A-1); Release cause (10A-2); and, authentication release key (10A-K).

As shown in FIG. 10B, the RRC CONNECTION RELEASE message (when used on the CCCH to release a single UE) includes typically (among other things) the following information elements: U-RNTI (10B-1); Release cause (10B-2); and; authentication release key (10B-K).

As shown in FIG. 10C, the RRC CONNECTION RELEASE message (when used on the DCCH to release a single UE) includes typically (among other things) the following information elements: Release cause (10C-2); and, authentication release key (10C-K).

As shown in FIG. 10D, the PAGING TYPE 1 message (for use on the paging channel when releasing a single UE) includes typically (among other things) the following information elements: U-RNTI (10D-1); release cause (10D-2); and, authentication release key (10D-K).

As shown in FIG. 10D, the PAGING TYPE 1 message (for use on the paging channel when releasing a group of UEs) includes typically (among other things) the following information elements: U-RNTI group (10E-1); release cause (10E-2); and, authentication release key (10E-K).

The "U-RNTI group" is an information element which, e.g., is utilized in conjunction with the messages of FIG. 10A and FIG. 10E, and is a generalization of the U-RNTI in the generic release message with omnibus release capability. As shown in Table 1, the U-RNTI group information element comprises a group discriminator field or subelement which indicates either that the message is directed to "all UEs" or that the recipients of the message are to be determined by using the "U-RNTI mask" field or subelement. In the first case in which the group discriminator field message is set to "all UEs", the message is addressed to all UEs that receive the message. If the group discriminator field message is set to "U-RNTI mask", a U-RNTI value and a U-RNTI bit mask index are also included. The latter indicates which bits in the U-RNTI that are to be matched with the UE's U-RNTI. Thus, the U-RNTI group is used to identify a group of UEs having an RRC connection.

TABLE 1

[000149]

| Information Element/Group name | Need | Multi | Type and reference | Semantics description | Version |
|---|---|---|---|---|---|
| CHOICE group discriminator | MP | | | | REL-5 |
| >All | | | | (no data) | REL-5 |
| >U-RNTI mask | | | | | REL-5 |
| >>U-RNTI | MP | | U-RNTI 10.3.3.47 | The bits that are less significant than the bit position indicated by the U-RNTI bit mask index shall be ignored. | REL-5 |
| >>U-RNTI bit mask index | MP | | Enumerated (b1, b2,..b31) | Values b1 to b19 indicate bit positions in the S-RNTI. Values b20 to b31 indicate bit positions in the SRNC identity. | REL-5 |

Thus, the interaction termination message (e.g., the message of action 1-7, action 2-7, action 5-7, or action 6-7) can be addressed either to an individual user equipment unit, to a group of user equipment units, or to all user equipment units for which the radio network controller (RNC) $26_1$ serves as the SRNC. Further information regarding addressing of an interaction termination message to plural user equipment units and the an omnibus release message is described in U.S. patent application Ser. No. 09/852,915, filed May 11, 2001, and entitled "RELEASING PLURAL RADIO CONNECTIONS WITH OMNIBUS RELEASE MESSAGE," incorporated by reference herein.

The foregoing authentication concepts and implementations can be applied in any cellular communications systems, like GSM or WCDMA. Although WCDMA has been used for sake of illustration and reference, the invention is not limited to any particular type of cellular network.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a communications network comprising:
   (1) for each of plural mobile nodes of the network, providing a same authentication key at a first node of the network;
   (2) for each of the plural nodes, using the authentication key to derive an authentication indicia related to the authentication key;
   (3) transmitting the authentication indicia over an air interface to the plural mobile nodes of the network; and then subsequently when it is necessary to release a group of mobile nodes
   (4) including the authentication key in an interaction termination message transmitted over the air interface from the first node to the plural mobile nodes; and
   (5) at each of the plural mobile nodes, confirming that the authentication key included in the interaction termination message is related to the authentication indicia as a condition for performing an interaction termination operation.

2. The method of claim 1, further comprising selecting the authentication key at the first node.

3. The method of claim 1, wherein the authentication indicia is related to the authentication key by being equal to the authentication key.

4. The method of claim 1, wherein the authentication indicia is related to the authentication key by a function.

5. The method of claim 1, wherein upon receiving the authentication key included in the interaction termination message, each of the plural mobile nodes perform the steps of:
   determining a calculated authentication indicia using the authentication key included in the interaction termination message;
   confirming that the calculated authentication indicia represents the authentication indicia provided at step (3).

6. The method of claim 1, wherein the authentication indicia is an authentication code which is related to the authentication key by a Kasumi function.

7. The method of claim 1, wherein the authentication indicia is an authentication code which is related to the authentication key by a Kasumi function $C=\mathrm{Kasumi}(M)_{AUTHENTICATION\ KEY}$, wherein:

M is a parameter derived from an identity of a mobile node;

AUTHENTICATION KEY is a parameter derived from the authentication key; and

C is the authentication indicia.

8. The method of claim 7, wherein M is derived from one of an U-RNTI of the mobile node and a core network UE identity of the mobile node.

9. The method of claim 7, wherein the AUTHENTICATION KEY is derived from the authentication key from plural concatenated instances of the authentication key.

10. The method of claim 1, wherein the first node is a radio access network node.

11. The method of claim 10, wherein the first node is radio network controller node.

12. The method of claim 10, further comprising:
    the radio access network node separately providing the authentication indicia to each of the plural mobile nodes in a first radio resource control (RRC) message;
    the radio access network node including the authentication key in a second radio resource control (RRC) message;
    each of the plural mobile nodes confirming that the authentication key included in the second radio resource control (RRC) message is related to the authentication indicia as a condition for perforating an interaction termination operation.

13. The method of claim 12, wherein the first radio resource control (RRC) message is a radio resource control (RRC) connection establish message and the second radio resource control (RRC) message is a radio resource control (RRC) connection release message.

14. The method of claim 10, further comprising the radio access network node providing the authentication indicia to the plural mobile nodes in conjunction with one of the following:
    a radio resource control (RRC) connection establish message;
    when a new U-RNTI is assigned;
    after ciphering has been started.

15. A method of operating a communications network comprising:
    (1) providing an authentication key at a mobile node of the network;
    (2) using the authentication key to derive an authentication indicia related to the authentication key;
    (3) transmitting the authentication indicia over an air interface to a fixed node of the network; and then subsequently
    (4) including the authentication key in an interaction termination message transmitted over the air interface between the mobile node and the fixed node; and
    (5) at the fixed node, confirming that the authentication key included in the interaction termination message is related to the authentication indicia as a condition for performing an interaction termination operation.

16. The method of claim 15, further comprising:
    the mobile node providing the authentication indicia to the fixed node upon occurrence of a predetermined event;
    the mobile node communicating the authentication key to the fixed node upon occurrence of an interaction termination event;
    the fixed node confirming that the authentication key communicated to the fixed node is related to the authentication indicia as a condition for performing an interaction termination operation.

17. The method of claim 16, wherein the predetermined event is registration of the mobile node with the fixed node.

18. The method of claim 16, wherein the interaction termination operation is a detach operation.

19. The method of claim 16, further comprising using an IMSI detach indication message to communicate the authentication key to the fixed node.

20. The method of claim 16, further comprising:
the mobile node using an IMSI or a TMSI of the mobile node to generate the authentication indicia which is provided to the fixed node upon the occurrence of the predetermined event.

21. The method of claim 20, further comprising:
the fixed node using the IMSI or the TMSI of the mobile node to confirm that the authentication key is related to the authentication indicia.

22. A communications network comprising:
a first node which stores an authentication key and which, for interactions with each of plural mobile nodes, uses the authentication key to derive an authentication indicia related to the authentication key;
a second node of the network;
means for causing the authentication indicia to be provided over an air interface to the plural mobile nodes in conjunction the respective interactions for the plural mobile nodes;
an authentication unit for the first node for including the authentication key in an interaction termination message, the interaction termination message being transmitted over the air interface from the first node to a group of mobile nodes; and
each of the plural mobile units comprising an authentication unit for confirming that the authentication key included in the interaction termination message is related to the authentication indicia as a condition for performing an interaction termination operation.

23. The apparatus of claim 22, wherein the authentication key is selected at the first node.

24. The apparatus of claim 22, wherein the authentication indicia is related to the authentication key by being equal to the authentication key.

25. The apparatus of claim 22, wherein the authentication indicia is related to the authentication key by a function.

26. The apparatus of claim 22, wherein the authentication unit for the second node comprises:
means for determining a calculated authentication indicia using the authentication key included in the interaction termination message;
means for confirming that the calculated authentication indicia represents the authentication indicia provided over the air interface.

27. The apparatus of claim 22, wherein the authentication indicia is an authentication code which is related to the authentication key by a Kasumi function.

28. The apparatus of claim 22, wherein the authentication indicia is an authentication code which is related to the authentication key by a Kasumi function C=Kasumi(M)$_{AUTHENTICATION\ KEY}$, wherein:
M is a parameter derived from an identity of a mobile node;
AUTHENTICATION KEY is a parameter derived from the authentication key; and
C is the authentication indicia.

29. The apparatus of claim 28, wherein M is derived from one of an U-RNTI of the mobile node and a core network UE identity of the mobile node.

30. The apparatus of claim 28, wherein the AUTHENTICATION KEY is derived from the authentication key from plural concatenated instances of the authentication key.

31. The apparatus of claim 22, wherein the first node is a radio access network node.

32. The apparatus of claim 31, wherein the first node is radio network controller.

33. The apparatus of claim 31, wherein the radio access network node provides the authentication indicia to the plural mobile nodes in separate first radio resource control (RRC) messages; wherein the radio access network node includes the authentication key in a second radio resource control (RRC) message; and wherein the mobile nodes confirm that the authentication key included in the second radio resource control (RRC) message is related to the authentication indicia as a condition for performing an interaction termination operation.

34. The apparatus of claim 33, wherein the first radio resource control (RRC) message is a radio resource control (RRC) connection establish message and the second radio resource control (RRC) message is a radio resource control (RRC) connection release message.

35. The apparatus of claim 31, wherein the radio access network node provides the authentication indicia to the plural mobile nodes in conjunction with one of the following:
a radio resource control (RRC) connection establish message;
when a new U-RNTI is assigned;
after ciphering has been started.

36. A communications network comprising:
a mobile node of the network;
a fixed node of the network;
wherein the mobile node stores an authentication key and uses the authentication key to derive an authentication indicia related to the authentication key;
means for causing the authentication indicia to be provided over an air interface to the fixed node in conjunction with the establishment an interaction with the fixed node;
an authentication unit for the first node for including the authentication key in an interaction termination message, the interaction termination message being transmitted over an the air interface between from the mobile node to the fixed node; and
an authentication unit for the fixed node which confirms that the authentication key included in the interaction termination message is related to the authentication indicia as a condition for performing an interaction termination operation.

37. The apparatus of claim 25, wherein the mobile node provides the authentication indicia to the fixed node upon occurrence of a predetermined event; wherein the mobile node communicates the authentication key to the fixed node upon occurrence of an interaction termination event; wherein the fixed node confirms that the authentication key communicated to the fixed node upon the occurrence of the interaction termination event is related to the authentication indicia as a condition for performing an interaction termination operation.

38. The apparatus of claim 37, wherein the predetermined event is registration of the mobile node with the fixed node.

39. The apparatus of claim 37, wherein the interaction termination operation is a detach operation.

40. The apparatus of claim 37, wherein the mobile node uses an IMSI detach indication message to communicate the authentication key to the fixed node.

41. The apparatus of claim 37, wherein the mobile node uses an IMSI or a TMSI of the mobile node to generate the authentication indicia which is provided to the fixed node upon the occurrence of the predetermined event.

42. The apparatus of claim 41, wherein the fixed node uses the IMSI or the TMSI of the mobile node to confirm that the authentication key is related to the authentication indicia.

43. A node of a communications network comprising:
an authentication key memory for storing an authentication key;
an authentication unit for using the authentication key to derive authentication indicia related to the authentication key and for sending the authentication indicia over an air interface to plural mobile nodes in conjunction with interactions with the respective plural mobile nodes; and
wherein when need arises to release the interactions for group of mobile nodes, the authentication unit includes the authentication key in an interaction termination message for transmission over the air interface to the group of mobile nodes.

44. The apparatus of claim 43, further comprising a key selection unit which selects the authentication key.

45. The apparatus of claim 43, wherein the authentication indicia is related to the authentication key by being equal to the authentication key.

46. The apparatus of claim 43, wherein the authentication indicia is related to the authentication key by a function.

47. The apparatus of claim 43, wherein the authentication indicia is an authentication code which is related to the authentication key by a Kasumi function.

48. The apparatus of claim 43, wherein the authentication indicia is an authentication code which is related to the authentication key by a Kasumi function C=Kasumi(M)$_{AUTHENTICATION\ KEY}$, wherein:
M is a parameter derived from an identity of a mobile node;
AUTHENTICATION KEY is a parameter derived from the authentication key; and
C is the authentication indicia.

49. The apparatus of claim 48, wherein M is derived from one of an U-RNTI of the mobile node and a core network UE identity of the mobile node.

50. The apparatus of claim 48, wherein the AUTHENTICATION KEY is derived from the authentication key from plural concatenated instances of the authentication key.

51. The apparatus of claim 43, wherein the node is a radio access network node.

52. The apparatus of claim 51, wherein the node is radio network controller.

53. The apparatus of claim 52, wherein the radio access network node transmits the authentication indicia in a first radio resource control (RRC) message, and wherein the radio access network node includes the authentication key in a second radio resource control (RRC) message.

54. The apparatus of claim 53, wherein the first radio resource control (RRC) message is a radio resource control (RRC) connection establish message and the second radio resource control (RRC) message is a radio resource control (RRC) connection release message.

55. The apparatus of claim 53, wherein the radio access network node provides the authentication indicia to the plural mobile nodes in conjunction with one of the following:
a radio resource control (RRC) connection establish message;
when a new U-RNTI is assigned;
after ciphering has been started.

56. A mobile node of a communications network comprising:
means for receiving an authentication indicia transmitted over an air interface;
an authentication unit which confirms that an authentication key included in connection release message transmitted to the mobile node over the air interface is related to the authentication indicia as a condition for performing a connection release operation.

57. The apparatus of claim 56, wherein the authentication indicia is related to the authentication key by being equal to the authentication key.

58. The apparatus of claim 56, wherein the authentication indicia is related to the authentication key by a function.

59. The apparatus of claim 56, wherein the authentication indicia is an authentication code which is related to the authentication key by a Kasumi function C=Kasumi(M)$_{AUTHENTICATION\ KEY}$, wherein:
M is a parameter derived from an identity of a mobile node;
AUTHENTICATION KEY is a parameter derived from the authentication key; and
C is the authentication indicia.

60. The apparatus of claim 59, wherein M is derived from one of an U-RNTI of the mobile node and a core network UE identity of the mobile node.

61. The apparatus of claim 59, wherein the AUTHENTICATION KEY is derived from the authentication key from plural concatenated instances of the authentication key.

62. The apparatus of claim 56, wherein the authentication unit comprises:
means for determining a calculated authentication indicia using the authentication key included in the connection release message;
means for confirming that the calculated authentication indicia represents the authentication indicia provided over the air interface.

63. The apparatus of claim 56, wherein the authentication indicia is received by the mobile node in a first radio resource control (RRC) message and wherein the authentication key is included in a second radio resource control (RRC) message; and wherein the mobile node confirms that the authentication key include in the second radio resource control (RRC) message is related to the authentication indicia as a condition for performing the connection release operation.

64. The apparatus of claim 63, wherein the first radio resource control (RRC) message is a radio resource control (RRC) connection establish message and the second radio resource control (RRC) message is a radio resource control (RRC) connection release message.

65. The apparatus of claim 56, wherein the mobile node receives the authentication indicia in conjunction with one of the following:
a radio resource control (RRC) connection establish message;
when a new U-RNTI is assigned;
after ciphering has been started.

66. The apparatus of claim 56, wherein the mobile node is a user equipment unit.

67. A node of a communications network comprising:
a memory which stores an association of a mobile node with an authentication indicia, the authentication indicia having been transmitted from the mobile node over an air interface;
means for determining a calculated authentication indicia using an authentication key included in an interaction termination message, the interaction termination message having been transmitted from the mobile node over an air interface;

means for confirming that the calculated authentication indicia represents the authentication indicia stored in the memory as a condition for performing a mobile detach operation.

68. The apparatus of claim 67, wherein the authentication indicia is related to the authentication key by being equal to the authentication key.

69. The apparatus of claim 67, wherein the authentication indicia is related to the authentication key by a function.

70. The apparatus of claim 67, wherein the authentication indicia is an authentication code which is related to the authentication key by a Kasumi function.

71. The apparatus of claim 67, wherein the authentication indicia is an authentication code which is related to the authentication key by a Kasumi function C=Kasumi(M)$_{AUTHENTICATION\ KEY}$, wherein:

M is a parameter derived from an identity of a mobile node;

AUTHENTICATION KEY is a parameter derived from the authentication key; and

C is the authentication indicia.

72. The apparatus of claim 71, wherein M is derived from one of an U-RNTI of the mobile node and a core network UE identity of the mobile node.

73. The apparatus of claim 71, wherein the AUTHENTICATION KEY is derived from the authentication key from plural concatenated instances of the authentication key.

74. The apparatus of claim 67, wherein the node is a core network node.

75. The apparatus of claim 74, wherein the interaction termination operation is a detach operation.

76. The apparatus of claim 74, wherein the core network node uses the IMSI or the TMSI of the mobile node to confirm that the authentication key is related to the authentication indicia.

77. The apparatus of claim 74, wherein the authentication indicia is received by the core network node during a mobile node registration procedure and wherein the authentication key is included in an IMSI detach indication message.

78. A mobile node of a communications network comprising:

a transceiver for transmitting an authentication indicia over an air interface;

a detach detect/notify function for determining when a detach operation is to be performed;

an authentication unit responsive to the detach detect/notify function for in including an authentication key derived from the authentication indicia in an detach message which is transmitted aver the air interface.

79. The apparatus of claim 78, further comprising a key selection unit which selects the authentication key.

80. The apparatus of claim 78, wherein the authentication indicia is related to the authentication key by being equal to the authentication key.

81. The apparatus of claim 78, wherein the authentication indicia is related to the authentication key by a function.

82. The apparatus of claim 78, wherein the authentication indicia is an authentication code which is related to the authentication key by a Kasumi function.

83. The apparatus of claim 78, wherein the authentication indicia is an authentication code which is related to the authentication key by a Kasumi function C=Kasumi(M)$_{AUTHENTICATION\ KEY}$, wherein:

M is a parameter derived from an identity of a mobile node;

AUTHENTICATION KEY is a parameter derived from the authentication key; and

C is the authentication indicia.

84. The apparatus of claim 83, wherein M is derived from one of an U-RNTI of the mobile node and a core network UE identity of the mobile node.

85. The apparatus of claim 83, wherein the AUTHENTICATION KEY is derived from the authentication key from plural concatenated instances of the authentication key.

86. The apparatus of claim 78, wherein the mobile node transmits the authentication indicia during a mobile node registration procedure and wherein the authentication key is included in an IMSI detach indication message.

87. The apparatus of claim 78, wherein the mobile node transmits the authentication indicia upon occurrence of a predetermined event, and wherein the mobile node communicates the authentication key to a core network node upon occurrence of an interaction termination operation.

88. The apparatus of claim 87, wherein the predetermined event is core network registration of the mobile node.

89. The apparatus of claim 87, wherein the interaction termination operation is a detach operation.

90. The apparatus of claim 78, wherein the mobile node uses an IMSI detach indication message to communicate the authentication key to a core network node.

91. The apparatus of claim 78, wherein the mobile node uses an IMSI or a TMSI of the mobile node to generate the authentication indicia which is provided to a core network upon the occurrence of the predetermined event.

92. The method of claim 1, wherein the interaction termination message is a connection release message.

93. The method of claim 1, further comprising separately transmitting the authentication indicia over the air interface to each of the plural mobile nodes upon establishment of connections with the respective plural mobile nodes.

94. The method of claim 1, further comprising transmitting the interaction termination message as a single message over the air interface from the first node to the plural mobile nodes.

95. The apparatus of claim 22, wherein the interaction termination message is a connection release message.

96. The apparatus of claim 22, wherein the authentication indicia is transmitted separately over the air interface to each of the plural mobile nodes upon establishment of connections with the respective plural mobile nodes.

97. The apparatus of claim 22, wherein the interaction termination message is transmitted as a single message over the air interface from the first node to the plural mobile nodes.

98. The apparatus of claim 43, wherein the interaction termination message is a connection release message.

99. The apparatus of claim 43, wherein the authentication indicia is transmitted separately over the air interface to each of the plural mobile nodes upon establishment of connections with the respective plural mobile nodes.

100. The apparatus of claim 43, wherein the interaction termination message is transmitted as a single message over the air interface from the first node to the plural mobile nodes.

* * * * *